(12) United States Patent
Woods et al.

(10) Patent No.: US 11,326,790 B2
(45) Date of Patent: May 10, 2022

(54) INTEGRATED DESICCANT-BASED COOLING AND DEHUMIDIFICATION

(71) Applicant: Alliance for Sustainable Energy, LLC, Golden, CO (US)

(72) Inventors: Jason David Woods, Boulder, CO (US); Eric Kozubal, Superior, CO (US)

(73) Assignee: Alliance for Sustainable Energy, LLC, Golden, CO (US)

(*) Notice: Subject to any disclaimer, the term of this patent is extended or adjusted under 35 U.S.C. 154(b) by 0 days.

(21) Appl. No.: 16/898,227

(22) Filed: Jun. 10, 2020

(65) Prior Publication Data
US 2020/0393145 A1     Dec. 17, 2020

Related U.S. Application Data

(60) Provisional application No. 62/986,908, filed on Mar. 9, 2020, provisional application No. 62/859,432, filed on Jun. 10, 2019.

(51) Int. Cl.
    *F24F 3/14*     (2006.01)
    *F24F 13/30*    (2006.01)

(52) U.S. Cl.
    CPC ............ *F24F 3/1417* (2013.01); *F24F 13/30* (2013.01); *F24F 2003/1435* (2013.01); *F24F 2003/1458* (2013.01)

(58) Field of Classification Search
    CPC ............ F24F 3/1417; F24F 2003/1435; F24F 2003/1458; F24F 13/30
    See application file for complete search history.

(56) References Cited

U.S. PATENT DOCUMENTS

| 4,832,115 A  * | 5/1989 | Albers ..................... B01D 1/14 |
|                |        |                            165/104.31 |
| 6,684,648 B2   | 2/2004 | Faqih |
| 8,252,092 B2   | 8/2012 | Govindan et al. |
| 2016/0228820 A1| 8/2016 | Hayes et al. |
| 2020/0164312 A1* | 5/2020 | Beh ..................... B01D 53/263 |

OTHER PUBLICATIONS

International Search Report and Written Opinion for PCT application No. PCT/US20/37044, dated Sep. 16, 2020, pp. 1-10.
Galama et al., "Seawater predesalination with electrodialysis", Desalination, 2014, vol. 342, pp. 61-69.

* cited by examiner

*Primary Examiner* — Elizabeth J Martin
(74) *Attorney, Agent, or Firm* — Alexandra M. Hall

(57) ABSTRACT

Integrated systems comprising both i) heat and mass exchange systems and ii) electrolysis stacks are disclosed, together with related methods of use. The disclosed systems cool and/or dehumidify air using two streams of salt solutions as liquid desiccants.

20 Claims, 10 Drawing Sheets

INTEGRATED DESICCANT-BASED COOLING AND DEHUMIDIFICATION

CROSS-REFERENCE TO RELATED APPLICATIONS

This application claims priority to U.S. Provisional Patent Application No. 62/859,432 filed Jun. 10, 2019 and U.S. Provisional Patent Application No. 62/986,908 filed Mar. 9, 2020, each of which is incorporated herein in its entirety by reference.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Air dehumidification is used around the world to provide comfortable and healthy indoor environments that are properly humidified. While being useful for conditioning supply air, conventional dehumidification systems are costly to operate as they use large amounts of energy (e.g., electricity). With the growing demand for energy, the cost of air dehumidification is expected to increase, and there is a growing demand for more efficient air dehumidification methods and technologies. Additionally, there are increasing demands for dehumidification technologies that do not use chemicals and materials, such as many conventional refrigerants, that may damage the environment if released or leaked. Maintenance is also a concern with many air dehumidification technologies, and, as a result, any new technology that is perceived as having increased maintenance requirements, especially for residential use, will be resisted by the marketplace.

State of the art vapor compression systems provide humidity control by first overcooling the air to remove humidity, and then reheating it to the desired temperature. This process is inefficient. Natural-gas-driven, open absorption systems offer an alternative, with better humidity control. But these are either inefficient (single-effect regeneration) or complex, expensive, and still require significant research (double-effect regeneration).

SUMMARY

Embodiments provided by the present disclosure can eliminate desiccant technologies' weaknesses by providing an all-electric option and eliminating water consumption by reclaiming water from the air.

In a first aspect, the present disclosure provides a dehumidification system, comprising: a heat and mass exchanger; at least one electrodialysis stack; a high salt ion concentration liquid desiccant; and a low salt ion concentration liquid desiccant, wherein the high salt ion concentration liquid desiccant and the low salt ion concentration liquid desiccant are in a single, continuous stream that connects the heat and mass exchanger and the at least one electrodialysis stack.

In some embodiments, the high salt ion concentration liquid desiccant absorbs water from a process air stream in the heat and mass exchanger and rejects salt ions to the low salt ion concentration liquid desiccant in the at least one electrodialysis stack.

In some embodiments, the low salt ion concentration liquid desiccant desorbs water from a purge air stream in the heat and mass exchanger and accepts ions from the high salt ion concentration liquid desiccant in the at least one electrodialysis stack.

In some embodiments, the high salt ion concentration liquid desiccant and the low salt ion concentration liquid desiccant comprise the same salt solution.

In some embodiments, the high salt ion concentration liquid desiccant and the low salt ion concentration liquid desiccant comprise a salt solution selected from sodium chloride, potassium chloride, potassium iodide, lithium chloride, copper(II) chloride, silver chloride, calcium chloride, chlorine fluoride, bromomethane, iodoform, hydrogen chloride, lithium bromide, hydrogen bromide, potassium acetate, 1-Ethyl-3-methylimidazolium acetate, and combinations thereof.

In some embodiments, the salt solution is selected from lithium chloride and calcium chloride.

In some embodiments, the salt solution is lithium chloride.

In some embodiments, upon entry into the heat and mass exchanger, the difference in salt ion concentration between the high salt ion concentration liquid desiccant and the low salt ion concentration liquid desiccant is 20% by weight (wt %).

In some embodiments, upon entry into the at least one electrolysis stack, the difference in salt ion concentration between the high salt ion concentration liquid desiccant and the low salt ion concentration liquid desiccant is 10 wt %.

In some embodiments, upon entry into the heat and mass exchanger, the high salt ion concentration liquid desiccant has a salt ion concentration of 35 wt %.

In some embodiments, upon entry into the heat and mass exchanger, the low salt ion concentration liquid desiccant has a salt ion concentration of 15 wt %.

In some embodiments, in the at least one electrodialysis stack, the high salt ion concentration liquid desiccant is converted into the low salt ion concentration liquid desiccant, and the low salt ion concentration liquid desiccant is converted into the high salt ion concentration liquid desiccant.

In some embodiments, the system comprises two, three, four, five, six, seven, eight, nine, ten, eleven, twelve, thirteen, fourteen, fifteen, sixteen, seventeen, eighteen, nineteen or twenty electrodialysis stacks arranged in series between a cathode and an anode.

In a second aspect, the present disclosure provides a method of dehumidifying air, comprising: absorbing water from a process air stream into a high salt ion concentration liquid desiccant in a heat and mass exchanger, dehumidifying the process air stream; desorbing water from a low salt ion concentration liquid desiccant into a purge air stream in the heat and mass exchanger; moving the high salt ion concentration liquid desiccant and the low salt ion concentration liquid desiccant to at least one electrodialysis stack; rejecting salt ions from the high salt ion concentration liquid desiccant to the low salt ion concentration liquid desiccant in the at least one electrodialysis stack, converting the high salt ion concentration liquid desiccant into the low salt ion concentration liquid desiccant; and accepting ions from the high salt ion concentration liquid desiccant into the low salt ion concentration liquid desiccant in the at least one electrodialysis stack, converting the low salt ion concentration liquid desiccant into the high salt ion concentration liquid desiccant; wherein: the high salt ion concentration liquid desiccant and the low salt ion concentration liquid desiccant flow in a single, continuous stream that connects the heat and mass exchanger and the at least one electrodialysis stack; and the converted high salt ion concentration liquid desiccant and the converted low salt ion concentration liquid desiccant are moved to the mass and heat exchanger.

In some embodiments, the method further comprises purging heat from the high salt ion concentration liquid desiccant into the low salt ion concentration liquid desiccant in the heat and mass exchanger, cooling the dehumidified process air stream.

In some embodiments, the high salt ion concentration liquid desiccant and the low salt ion concentration liquid desiccant comprise the same salt solution selected from sodium chloride, potassium chloride, potassium iodide, lithium chloride, copper(II) chloride, silver chloride, calcium chloride, chlorine fluoride, bromomethane, iodoform, hydrogen chloride, lithium bromide, hydrogen bromide, potassium acetate, 1-Ethyl-3-methylimidazolium acetate, and combinations thereof.

In some embodiments, the salt solution is selected from lithium chloride and calcium chloride.

In some embodiments, the salt solution is lithium chloride.

In some embodiments, when absorbing water from a process air stream into a high salt ion concentration liquid desiccant and desorbing water from a low salt ion concentration liquid desiccant, the difference in salt ion concentration between the high salt ion concentration liquid desiccant and the low salt ion concentration liquid desiccant is 20% by weight (wt %).

In some embodiments, when initiating the rejection of salt ions from the high salt ion concentration liquid desiccant to the low salt ion concentration liquid desiccant in the at least one electrodialysis stack, and when initiating the acceptance of ions from the high salt ion concentration liquid desiccant into the low salt ion concentration liquid desiccant in the at least one electrodialysis stack, the difference in salt ion concentration between the high salt ion concentration liquid desiccant and the low salt ion concentration liquid desiccant is 10 wt %.

In some embodiments, when absorbing water from the process air stream, the high salt ion concentration liquid desiccant has a salt ion concentration of 35 wt %.

In some embodiments, when desorbing water into the purge air stream, the low salt ion concentration liquid desiccant has a salt ion concentration of 15 wt %.

BRIEF DESCRIPTION OF THE DRAWINGS

Exemplary embodiments are illustrated in the referenced figures of the drawings. It is intended that the embodiments and figures disclosed herein are to be considered illustrative rather than limiting.

DETAILED DESCRIPTION

Figure 1:
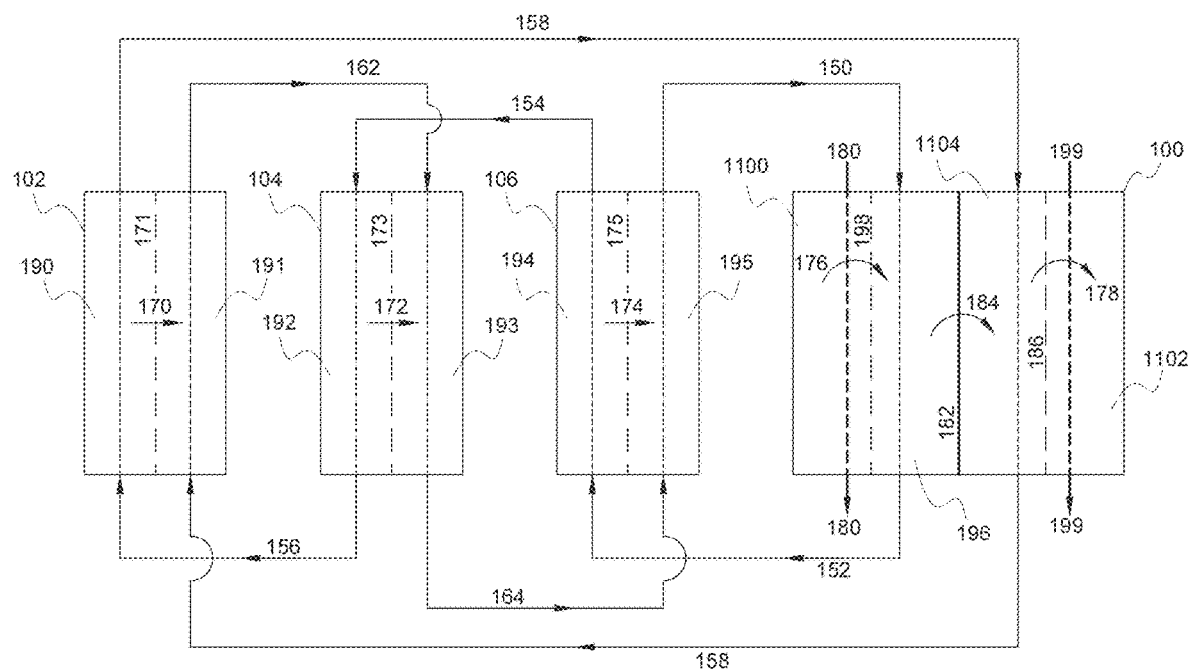
FIG. 1 illustrates, in schematic form, a cooling and dehumidification system provided by embodiments of the present disclosure. The depicted embodiment comprises an integrated system of a single heat and mass exchanger 100 and three electrolysis stacks 102, 104 and 106.

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

The phrases "inlet supply air," "inlet supply airstream," "process air," and "process air stream" are used interchangeably herein. All refer to an airstream that is to be cooled and dehumidified by the systems and methods provided by the present disclosure.

The present disclosure provides systems and methods for the dehumidification and conditioning of air. This involves the use of liquid desiccants that flow through the systems in a closed loop, through a single, integrated system comprising one or more heat and mass exchangers and one or more electrodialysis stacks. The heat and mass exchangers transfer heat and humidity from process air (to be dehumidified) into a liquid desiccant stream that is high in salt ion concentration (i.e., a high concentration liquid desiccant stream). The transferred heat is then moved from the high concentration desiccant stream into a liquid desiccant stream that is low in salt ion concentration (i.e., a low concentration liquid desiccant stream). Thereafter, heat and humidity are moved from the low salt ion concentration desiccant stream into an exhaust air stream, which is purged from the system. In doing so, the heat and mass exchangers remove the process air from a space, for example a room in a building (home, office or otherwise), move the process air through the heat and mass exchangers where it is dehumidified and cooled, and then reintroduce that process air into the space from which it was removed. The end result being reintroduction of dehumidified and cooled air into the space from which it was originally removed. Removal of water from the process air dilutes the ion concentration of the high concentration liquid desiccant stream by adding water to it. Likewise, removal of water from the low concentration desiccant stream into the exhaust air concentrates the ions in the low concentration stream. In order to volumetrically reconstitute those desiccant streams, after the process air is dehumidified and cooled, the high concentration liquid desiccant stream and low concentration liquid desiccant stream are moved from a heat and mass exchanger to one or more electrodialysis stacks where the high concentration liquid desiccant stream is converted into the low concentration liquid desiccant stream and, likewise, the low concentration liquid desiccant stream is converted into the high concentration liquid desiccant stream, before being returned to the heat and mass exchanger for further dehumidification of air.

The systems provided by the present disclosure therefore comprise integrated functionality between one or more heat and mass exchangers and one or more electrodialysis stacks. The disclosed systems serve to dehumidify and/or cool a process air flow in order to maintain environmental comfort in an enclosed space. Unlike other such systems known in the art, such as liquid desiccant air conditioning units, no heating steps are required in the embodiments provided by the present disclosure. Such steps can be expensive and require significant energy input, depending on the temperature and humidity of the process air flow. Given that, it is anticipated that the new systems and methods disclosed herein will provide significant cost and energy savings for both manufacturers and consumers.

Dehumidification of process air is achieved via the use of one or more mass and heat exchangers (or transfer assemblies) as indirect evaporative coolers and/or heat exchangers. Each mass and heat exchanger is formed of alternating stacks, each, in some embodiments, including a first (or upper) layer or sheet of membrane material, a separation wall, and a second (or lower) layer or sheet of membrane material. The upper and lower membranes are permeable to water molecules in the vapor state while the separation wall is impermeable to water but allows heat transfer (i.e., is a thin layer and/or is made of materials that conduct heat). In each mass and heat exchanger, a high concentration liquid desiccant flows between the first membrane layer and the separation wall and a low concentration liquid desiccant flows between the separation wall and the second membrane layer. In some embodiments, when one or more mass and heat exchangers are used in tandem, the flow order of the air streams is reversed, such that they are flowing in opposite directions to each other. When more than two mass and heat exchangers are used in tandem, this reversal of flow ordering is repeated to form alternating supply and exhaust air flow channels or chambers. Process air (or air to be dehumidified and cooled) is directed through a first channel along a first side of the first water permeable membrane while a portion of the pre-cooled exhaust air (e.g., a fraction of the process air that has already been dehumidified and cooled by previous flow through one or more mass and heat exchanger(s)) is directed through a second channel along a second side of a second water permeable membrane, typically in a counterflow arrangement relative to the flow of the incoming process air. Thus, the high concentration liquid desiccant flow is on the other side of the first water permeable membrane from the process air, while the low concentration liquid desiccant flow is on the other side of the second water permeable membrane from the exhaust airflow (i.e., the fraction of previously processed air directed to be exhausted). As noted above, the flow of the exhaust, or purge, air can be counter to that of the process air flow, or in the same direction, depending on the desired arrangement of mass and heat exchangers, as follows:

First Chamber:
→Process air intake→
First water permeable membrane
→High ion concentration liquid desiccant→
Water Impermeable, Heat Permeable Plate
Second Chamber:
→Low ion concentration fluid desiccant→
Second water permeable membrane
←Exhaust air←—or—→Exhaust air→

Figure 2:
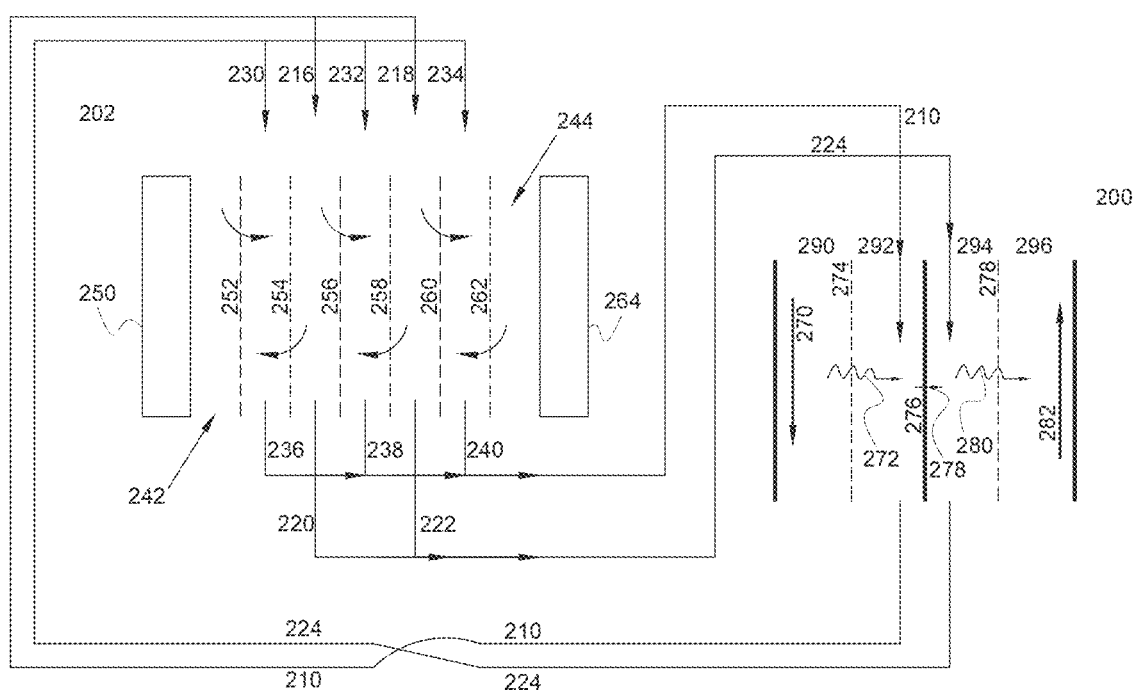
FIG. 2 illustrates, in schematic form, another cooling and dehumidification system provided by embodiments of the present disclosure. The depicted embodiment comprises an integrated system of a single heat and mass exchanger 200 and a single electrolysis stack 202, wherein the electrolysis stack 202 contains a plurality of channels within a single stack where ion exchange may take place.

Such an arrangement can be seen in, for example, FIG. 2. In various embodiments, the supply air inlet airflow, supply outlet airflow, exhaust airflow, and both liquid desiccant flows are plumbed such as via one or more manifold assemblies into a heat and mass exchanger, which can be provided in a housing as a single unit such as, for example, an indirect evaporative cooler.

In several embodiments, dehumidification and evaporative cooling of the process air are accomplished by separation of the process air and the high concentration liquid desiccant by a water-permeable membrane. The membrane is formed of one or more substances or materials to be permeable to water molecules in the vapor state. The permeation of the water molecules through the membrane enables/is a driving force behind dehumidification and evaporative cooling of the process air stream. As described above, multiple air streams can be arranged to flow through the chambers of a single heat and mass exchanger such that a secondary (exhaust) air stream, which in several embodiments is an exhaust airflow of pre-cooled air, is humidified and absorbs enthalpy from the process air stream. The process air stream is cooled and simultaneously dehumidified by flowing a high concentration liquid desiccant along the opposite side of the water permeable membrane, allowing water to move across the membrane.

The same type of membrane is also used to separate the flow of a low concentration liquid desiccant from the exhaust airflow channel or chamber, such that the membrane separates the low concentration liquid desiccant from the exhaust air stream. Wicking materials/surfaces or other devices may be used to contain or control water flow (e.g., direct-contact wicking surfaces could be used in combination with the use of the liquid desiccant containment by a membrane), but membrane liquid control facilitates fabrication of the stacks or manifold structure useful for the heat and mass exchanger configurations disclosed herein that provide cooling and dehumidification of a process airflow. In such configurations, the air streams can be arranged in counter-flow, counter-flow with pre-cooled exhaust air, cross-flow, parallel flow, and impinging flow to perform desired simultaneous heat and mass exchange in a single evaporative cooling units containing more than one heat and mass exchanger.

The embodiments disclosed herein generally use one continuous stream of liquid desiccant, which can be described as a stream with portions of high and low salt concentration. The portions of the stream that are high in salt contain from about 20% to about 45% salt by weight. The portions of the stream that are low in salt concentration contain from about 3% to about 30% salt by weight. The concentrations are controlled by the amount of water absorbed into the high concentration liquid desiccant stream which, in some embodiments, matches the water desorbed from the low concentration stream.

The salt ion concentration of the high concentration liquid desiccant can vary in order to influence the target humidity of the process air stream. As the desired level of humidity of the process air stream decreases, the salt ion concentration of the high concentration liquid desiccant can increase. Increasing the salt ion concentration of the high concentration liquid desiccant allows it to remove more water from the process air stream.

The salt ion concentration of the low concentration liquid desiccant can also vary in order to influence the target humidity and/or temperature of the process air stream. The low concentration liquid desiccant desorbs water into the exhaust, or purge, air stream which, in some embodiments, reflects the ambient environment. Lower ambient humidity will allow for higher concentrations in this low concentration desiccant, meaning it will still be able to desorb enough water to maintain the integrity of the disclosed systems. At ambient humidity, the concentration of the low concentration liquid desiccant can be reduced in order to maintain a rate of water desorption.

As a person skilled in the art will appreciate, the salt ion concentrations of both the low and high concentration liquid desiccants can also vary based on the salt solution used. Some salt solutions will serve to dehumidify a process air stream more efficiently than others, and those that are less efficient may require a higher salt ion concentration in order to achieve a target outlet humidity.

Some embodiments also include a second heat and mass exchanger, wherein the first heat and mass exchanger receives inlet process air from an airstream, for example from ambient air or air return from a building, and the second heat and mass exchanger receives as the exhaust or purge air a stream of process air that has been dehumidified. The dehumidified process air that serves as the exhaust or purge air for the second heat and mass exchanger is produced by and flows from the first heat and mass exchanger.

A separation wall, also referred to herein as a plate, separates the first and second chambers described above. The wall is formed from a material (such as plastic) that is impermeable to the high concentration and low concentration liquid desiccants but that conducts or allows heat removed from the process air supply to be moved to the low concentration liquid desiccant.

In various embodiments, the low concentration liquid desiccant and high concentration liquid desiccant comprise a halide salt solution. As described herein, the flow of the desiccant streams overlap, or move through the disclosed systems in a continuous quasi-figure-8 pattern, with the low concentration desiccant stream being processed to become the high concentration desiccant stream, and vice versa. Because of that, both desiccant streams are made of the same solution, often a halide salt solution, with the difference between the two being the concentration of ions in the particular desiccant flow stream. The desiccant solution can be a halide salt can be selected from sodium chloride (NaCl), potassium chloride (KCl), potassium iodide (KI), lithium chloride (LiCl), copper(II) chloride ($CuCl_2$), silver chloride (AgCl), calcium chloride ($CaCl_2$), chlorine fluoride (CIF), bromomethane ($CH_3Br$), iodoform ($CHI_3$), hydrogen chloride (HCl), lithium bromide (Liar), hydrogen bromide (HBr), and combinations thereof. In some embodiments, the halide salt solution is selected from LiCl and $CaCl_2$). In some embodiments, the halide salt solution is LiCl. The desiccant can also be potassium acetate or 1-Ethyl-3-methylimidazolium acetate (CAS number 143314-17-4).

The disclosed systems are integrated systems comprising both i) one or more heat and mass exchangers and ii) one or more electrolysis stacks. As stated briefly above, and in detail below, water is removed from the process air stream. This provides two advantages to the disclosed systems. First, the process air is dehumidified before it is returned to an enclosed space, helping to effect climate control in that enclosed space. Second, the water removed from the process air stream is moved directly into the high concentration desiccant stream. In contrast, water is removed from the low concentration desiccant stream into the exhaust or purge air stream, which is them removed from the system. The flow of the desiccant streams overlap, or operate in a quasi-figure-8 pattern, with the low concentration desiccant stream being processed via electrolysis to become the high concentration desiccant stream, and vice versa. By bringing water into the disclosed systems via the high concentration desiccant stream, the disclosed systems reclaim water from the air for use in cooling and dehumidifying more process air. Doing so allows the systems to utilize less water from municipal sources, easing environmental impacts.

The inventors have surprisingly determined that an integrated system comprising both i) heat and mass exchange systems and ii) electrolysis stacks, can be operated to cool and dehumidify air with great efficiency using two streams of salt solutions as liquid desiccants. In the heat and mass exchange systems, the concentration difference between the high concentration liquid desiccant and the low concentration liquid desiccant can be as much as 20 wt % wherein, in some embodiments, the high concentration liquid desiccant entering the heat and mass exchanger has a salt ion concentration of about 35 wt % and the low concentration liquid desiccant entering the heat and mass exchanger has a salt ion concentration of about 15 wt %. A desiccant stream of pure water is not used.

Electrodialysis has not been explored previously between high concentration (about 35 wt %) and low concentration (about 15 wt %) fluid desiccants; the present disclosure provides systems utilizing fluid desiccant streams having these concentrations. Namely, the present disclosure provides systems comprising i) a heat and mass exchange system whereby high concentration and low concentration fluid desiccants are used to dehumidify and/or cool air, and ii) an electrodialysis system that transfers ions from the spent high concentration liquid desiccant leaving the exchanger into the spent low concentration liquid desiccant, effectively converting one fluid flow to the other. This is achieved using multi-stage electrochemical deionization systems, which lower the concentration gradients across the membrane by distributing this gradient across several ion transport stages. The use of two streams of the same halide salt solution at differing ion concentrations as liquid desiccants has not been disclosed in the literature in an integrated system such as those disclosed herein.

In addition to the exemplary aspects and embodiments described above, further aspects and embodiments will become apparent by reference to the drawings and by study of the following descriptions.

In a first embodiment, the present disclosure provides the system for dehumidifying a process air removed from and then resupplied to a space depicted in FIG. 1. The system is a single, integrated system comprising a heat and mass exchanger 100 directly coupled to multiple electrodialysis stacks (102, 104, 106). The heat and mass exchanger 100 contains: a first flow channel 1100 for through which a stream of inlet supply air 180 flows; a second flow channel 196 adjacent to the first flow channel 1100, for receiving and outputting a high concentration liquid desiccant 150; a third flow channel 1104 adjacent to the second flow channel 196 for receiving and outputting a low concentration liquid desiccant 158; and a fourth flow channel 1102 adjacent to the third flow channel 1104 through which a stream of exhaust air 199 flows. The first and second flow channels are defined in part by a first vapor permeable membrane 198 that separates the first and second flow channels, wherein humidity (water vapor) 176 moves across the first vapor permeable membrane 198 from the stream of inlet supply air 180 to the high concentration liquid desiccant 150. The third and fourth flow channels are defined in part by a second vapor permeable membrane 186 that separates the third and fourth flow channels. Humidity 178 flows across the second vapor permeable membrane 186 from the low concentration liquid desiccant 158 to the stream of exhaust air 199. The second and third flow channels are defined in part by a separation wall 182 that separates the second 196 and third 1104 flow channels. The separation wall 182 allows transfer heat 184 to be transferred from the second flow channel 196 to the third flow channel 1104.

In this embodiment, the high concentration liquid desiccant 150 enters the second flow channel 196 with a salt ion concentration of about 35 wt %, and the low concentration liquid desiccant 158 enters the third channel 1104 with a salt ion concentration of about 15 wt %—a difference of about 20 wt % in salt ion concentration. It is as this point in the disclosed system where the salt ion concentration between the two desiccants is at its maximal point. As the two desiccants move through the heat and mass exchanger, the high concentration liquid desiccant 150, having gained water from the inlet supply air 180, has its salt concentration drop from 35 wt % to 30 wt %; it is at 30 wt % concentration when it is moved from the heat and mass exchanger to the third electrolysis stack 106. Additionally, the low concentration liquid desiccant 158 loses water to the exhaust air 199, causing its salt concentration to increase from 15 wt % to 20 wt % when it is moved to the first electrolysis stack 102.

The embodiment depicted in FIG. 1 also comprises three electrodialysis stacks 102, 104, 106. The first electrodialysis stack 102 includes a first electrodialysis flow channel 190 defined in part by a first cation permeable membrane 171, into which a second stream of intermediate low concentration liquid desiccant 156, having a salt concentration of 20 wt %, flows and out of which the first stream of low concentration liquid desiccant 158, having a salt concentration of 15 wt %, flows, the desiccant 156 having lost 5 wt % of its salt ions during electrolysis in the first stack 102. The first electrodialysis stack 102 also includes a second electrodialysis flow channel 191 defined in part by the first cation permeable membrane 171, into which the low concentration liquid desiccant 158, having just left the heat and mass exchanger with an ion concentration of 20 wt %, flows and out of which a first stream of intermediate high concentration liquid desiccant 162, having a salt concentration of 25 wt %, flows, the desiccant 158 having gained 5 wt % of salt ions during electrolysis in the first stack 102. Cations 170 flow from the low concentration liquid desiccant 158 across the first cation permeable membrane 171 into the second stream of intermediate low concentration liquid desiccant 156. The cation content of the low concentration liquid desiccant 158 increases, or becomes more concentrated, by addition of cations 170, thereby producing a first stream of intermediate high concentration liquid desiccant 162. The cation concentration of the second stream of intermediate low concentration liquid desiccant 156 decreases, or becomes more dilute, by removal of cations 170, thereby regenerating the low concentration liquid desiccant 158.

The second electrodialysis stack 104 includes a third electrodialysis flow channel 192 defined in part by a second cation permeable membrane 173, into which a first stream of intermediate low concentration liquid desiccant 154, having a salt ion concentration of 25 wt %, flows and out of which the second stream of intermediate low concentration liquid desiccant 156, having a salt ion concentration of 20 wt %, flows, the desiccant 154 having lost 5 wt % of its salt ions during electrolysis in the second stack 104. The second electrodialysis stack 104 also includes a fourth electrodialysis flow channel 193 defined in part by the second cation permeable membrane 173, into which the first stream of intermediate high concentration liquid desiccant 162, having a salt ion concentration of about 25 wt %, flows, and out of which a second stream of intermediate high concentration liquid desiccant 164, having a salt ion concentration of 30 wt %, flows, the desiccant 162 having gained 5 wt % in salt ions during electrolysis in the second stack 104. Cations 172 flow from the first stream of intermediate low concentration liquid desiccant 154 across the second cation permeable membrane 173 into the first stream of intermediate high concentration liquid desiccant 162. The cation concentration of the first stream of intermediate low concentration liquid desiccant 154 is decreased, or diluted, by removal of the cations 172, thereby producing the second stream of intermediate low concentration liquid desiccant 156. The cation concentration of the first stream of intermediate high concentration liquid desiccant 162 is concentrated by the addition of the cations 172, thereby producing the second stream of intermediate high concentration liquid desiccant 164.

The third electrodialysis stack 106 includes a fifth electrodialysis flow channel 194 defined in part by a third cation permeable membrane 175, into which the high concentration liquid desiccant 152, having a salt ion concentration of 30 wt %, flows and out of which the first stream of intermediate low concentration liquid desiccant 154, having a salt ion concentration of 25 wt %, flows, the desiccant 152 having lost 5 wt % of its salt ions during electrolysis in the third stack 106. The third electrodialysis stack 106 also includes a sixth electrodialysis flow channel 195 defined in part by the third cation permeable membrane 175, into which the second stream of intermediate high concentration liquid desiccant 164, having a salt ion concentration of 30 wt %, flows and out of which the high concentration liquid desiccant 150, having a salt ion concentration of 35 wt %, flows, the desiccant 164 having gained 5 wt % of salt ions during electrolysis in the third stack 106. Cations 174 flow from the high concentration liquid desiccant 150 across the third cation permeable membrane 175 into the second stream of intermediate high concentration liquid desiccant 164. The cation concentration of the high concentration liquid desiccant 150 is decreased, or diluted, by removal of cations 174 to produce the first stream of intermediate low concentration liquid desiccant 154. The cation concentration of the second stream of intermediate high concentration liquid desiccant 164 is increased, or concentrated, by the addition of the cations 174 to regenerate the high concentration liquid desiccant 150.

In each of the three electrodialysis stacks 102, 104 and 106, cations move across the cation permeable membranes 171, 173, 175 according to an electric field applied to each of the three electrodialysis stacks 102, 104, 106. Briefly, cations, which are positively charged, will move away from a cathode (not shown), or positively charged component of an electrochemical cell, toward a negatively charged component, or anode (not shown). In the embodiment depicted in FIG. 1, the cathode(s) would be located to the left of each of the of the three electrodialysis stacks 102, 104, 106, causing the cations 170, 172, 174 to move away from it, across the cation permeable membranes 171, 173, 175. The anode(s) would be located to the right of each of the three electrodialysis stacks 102, 104, 106, causing the cations 170, 172, 174 to move toward it. Because the cation permeable membranes 171, 173, 175 are only permeable to cations, anions present in the salt solutions will not move. The net effect being that the desiccant streams 162, 164 and 150 become increasingly concentrated with ions as they flow through the three electrodialysis stacks 102, 104, 106. Similarly, the ion concentrations of desiccant streams 154, 156 and 158 decrease, becoming increasingly dilute as cations 174, 172 and 170 are removed from them. The depicted embodiment can be a single electrochemical cell, having a single cathode on one side (to the left in FIG. 1) and a single anode on the other side (to the right in FIG. 1). Alternatively, in the depicted embodiment each of the three electrodialysis stacks 102, 104, 106 can be its own electrochemical cell, having its own cathode and anode; in such an alternative embodiment, the arrangement of the cathodes and anodes will be the same as described above relative to FIG. 1, with the cathode to the left and anode to the right, allowing the depicted movement of cations 170, 172, 174.

In this embodiment, the low concentration liquid desiccant 158 and high concentration liquid desiccant 150 are each the same halide salt solution. As shown in FIG. 1, the flow of the desiccant streams 150 and 158 overlap, or move through the disclosed system depicted in FIG. 1 in a continuous quasi-figure-8 pattern, with the low concentration desiccant stream 158 being processed to become the high concentration desiccant stream 150, and vice versa. Because of that, both desiccant streams are made of the same solution, often a halide salt solution, with the difference between the two being the concentration of ions in the particular desiccant flow stream—the high concentration liquid desiccant 150 having a salt ion concentration of 35 wt %, and the low concentration liquid desiccant 158 having a salt ion concentration of 15 wt %, when both desiccants enter the heat and mass exchanger. The halide salt can be selected from sodium chloride (NaCl), potassium chloride (KCl), potassium iodide (KI), lithium chloride (LiCl), copper(II) chloride ($CuCl_2$), silver chloride (AgCl), calcium chloride ($CaCl_2$)), chlorine fluoride (ClF), bromomethane ($CH_3Br$), iodoform ($CHI_3$), hydrogen chloride (HCl), lithium bromide (LiBr) hydrogen bromide (HBr), and combinations thereof. In some embodiments, the halide salt solution is selected from LiCl and $CaCl_2$. In some embodiments, the halide salt solution is LiCl. The desiccant can also be potassium acetate or 1-Ethyl-3-methylimidazolium acetate (CAS number 143314-17-4).

In this embodiment, the water 176 removed from the inlet supply air 180 moves directly into the high concentration desiccant stream 150. In contrast, water 178 is removed from the low concentration desiccant stream 158 into the exhaust or purge air stream 199, which is them removed from the integrated system. As shown in FIG. 1, the flow of the desiccant streams 150 and 158 overlap, or operate in a quasi-figure-8 pattern, with the low concentration desiccant stream 158 being processed via electrolysis to become the high concentration desiccant stream 150, and vice versa. By bringing water 176 into the system of this embodiment via the high concentration desiccant stream 150, the disclosed system reclaims water from the inlet supply air 180 for use in cooling and dehumidifying more inlet supply air 180 in subsequent operational cycles. Doing so allows the system of this embodiment to utilize less water from municipal sources, easing environmental impacts.

The embodiment depicted in FIG. 1 includes three electrodialysis stacks. One of skill in the art will recognize that the number of electrodialysis stacks can vary and that a sufficient number of electrodialysis stacks can be used in order to generate a low concentration liquid desiccant 158 and a high concentration liquid desiccant 150 with a desired cation concentration. More than one heat and mass exchanger can also be used. Also, while only two liquid desiccant streams are shown, the skilled artisan will recognize that there can also be multiple repeating pairs of channels with additional solution flows. The modifications to the system to accommodate fewer or more than three electrodialysis stacks, multiple solution flows in repeating pairs of channels, and more than one heat and mass exchanger would be known to one of skill in the art.

In a second embodiment, the present disclosure provides the system for dehumidifying air supplied to a space depicted in FIG. 2, and related methods of use. FIG. 2 depicts a single, integrated system comprising a heat and mass exchanger 200 and a single, multilayer electrodialysis stack 202. The heat and mass exchanger 200 includes a first flow channel 290 through which a stream of inlet supply air 270, a second flow channel 292 adjacent to the first flow channel 290 through which a stream of high concentration liquid desiccant 210 flows, a third flow channel 294 adjacent to the second flow channel 292 through which a stream of low concentration liquid desiccant 224 flows, and a fourth flow channel 296 adjacent to the third flow channel 294 through which a stream of exhaust air 282 flows. The first and second flow channels 290 and 292 are defined in part by a first vapor permeable membrane 274 that separates the first and second flow channels 290 and 292, wherein humidity 272 (water vapor) flows from the stream of inlet supply air 270 into the high concentration liquid desiccant 210, wherein the high concentration liquid desiccant 210 increases in volume with the addition of water from the inlet supply air 270. Similarly, the third and fourth flow channels 294 and 296 are defined in part by a second vapor permeable membrane 278 that separates the third and fourth flow channels 294 and 296. Humidity 280 (water vapor) flows from the low concentration liquid desiccant 224 into the exhaust air 282. The low concentration liquid desiccant 224 decreases in volume as water is removed from it into the exhaust air 282. The second and third flow channels are defined in part by a separation wall 276 that separates the second and third flow channels 292 and 294, wherein the separation wall 276 is impermeable to the flow of water or water vapor, but made of a material capable of transferring heat 278 from the second flow channel 292 to the third flow channel 294. The movement of heat 278 reduces the temperature of the inlet supply air 270 as it flows through the first flow channel 290.

As shown in FIG. 2, the low concentration liquid desiccant 224 and the high concentration liquid desiccant 210 then move from the heat and mass exchanger 200 to the integrated, multilayer electrodialysis stack 202. The electrodialysis stack 202 depicted in FIG. 2 includes seven flow channels. A first flow channel, which receives a stream of a first electrolyte solution 242, is defined in part by an anode plate 250 and in part by a first cation exchange membrane 252. A second flow channel, adjacent to the first flow channel, is defined in part by the first cation exchange membrane 252 and in part by a first anion exchange membrane 254; this second flow channel receives a first portion 230 of the low concentration liquid desiccant 224 and outputs a first portion 236 of the high concentration liquid desiccant 210. A third flow channel, adjacent to the second flow channel, is defined in part by the first anion exchange membrane 254 and in part by a second cation exchange membrane 256; this third flow channel receives a first portion 216 of the high concentration liquid desiccant 210 and outputs a first portion 220 of the low concentration liquid desiccant 224. A fourth flow channel, adjacent to the third flow channel, is defined in part by the second cation exchange membrane 256 and in part by a second anion exchange membrane 258; this fourth flow channel receives a second portion 232 of the low concentration liquid desiccant 224 and outputs a second portion 238 of the high concentration liquid desiccant 210. A fifth flow channel, adjacent to the fourth flow channel, is defined in part by the second anion exchange membrane 258 and in part by a third cation exchange membrane 260; this fifth flow channel receives a second portion 218 of the high concentration liquid desiccant 210 and outputs a second portion 222 of the low concentration liquid desiccant 224. A sixth flow channel, adjacent to the fifth flow channel, is defined in part by the third cation exchange membrane 260 and in part by a third anion exchange membrane 262; this sixth flow channel receives a third portion 234 of the low concentration liquid desiccant 224 and outputs a third portion 240 of the high concentration liquid desiccant 210. A seventh flow channel, which receives a stream of a second electrolyte solution 244, is defined in part by the third anion exchange membrane 262 and in part by a cathode plate 264. Some embodiments include additional electrodialysis stacks similar to the electrodialysis stack described above.

As shown in FIG. 2, after leaving the heat and mass exchanger 200, the high concentration liquid desiccant 210 is moved to the electrodialysis stack 202, where it is split into two parts 216 and 218, which enter the third and fifth channels, respectively. Additionally, after leaving the heat and mass exchanger 200, the low concentration liquid desiccant 224 is moved to the electrodialysis stack 220, where it is split into three parts 230, 232 and 234, which enter the second, fourth, and sixth channels, respectively. Electrodialysis is then performed in the depicted channels, with cations moving away from cathode plate 264 toward anode plate 250, and anions moving away from anode plate 250 and toward cathode plate 264. As the liquid desiccants move through the channels, ions move across the ion permeable membranes 252, 254, 256, 258, 260 and 262 in the directions shown. The result of electrodialysis is that the concentration of ions in the liquid desiccant moving through the second, fourth and sixth channels increases; fractions 236, 238 and 240 are then pooled to become the high concentration liquid desiccant 224 that is recycled to the heat and mass exchanger 200. Concomitantly, the concentration of ions in the liquid desiccant moving through the third and fifth channels decreases; fractions 220 and 222 are then pooled to become the low concentration liquid desiccant 224 that is recycled to the heat and mass exchanger 200.

In this embodiment, the low concentration liquid desiccant 224, after leaving the heat and mass exchanger 200, is moved to the electrodialysis stack 202 where it is subjected to electrodialysis. The result of that electrodialysis is that the low concentration liquid desiccant 224 is then converted into the high concentration liquid desiccant 210 and moved back to the heat and mass exchanger 200. Likewise, the high concentration liquid desiccant 210, after leaving the heat and mass exchanger 200, is moved to the electrodialysis stack 202 where it is subjected to electrodialysis. The result of that electrodialysis is that the high concentration liquid desiccant 210 is then converted into the low concentration liquid desiccant 224 and moved back to the heat and mass exchanger 200. The integration of the heat and mass exchanger 200 with the electrodialysis stack 202 allows for the two liquid desiccant streams to be exchanged for one another during the processing of the inlet supply air 270. This allows for repeated reuse of both desiccant streams, as volume and ionic content are moved back and forth between the liquid desiccant streams, while using less electricity. The end result is an integrated system that is more energy efficient than indirect evaporative cooling and dehumidification systems currently on the market.

Additionally, in this embodiment the low concentration liquid desiccant 224 and high concentration liquid desiccant 210 are each the same halide salt solution. As shown in FIG. 2, the flow of the desiccant streams 210 and 224 overlap, or move through the disclosed system depicted in FIG. 2 in a continuous quasi-figure-8 pattern, with the low concentration desiccant stream 224 being processed to become the high concentration desiccant stream 210, and vice versa. Because of that, both desiccant streams are made of the same solution, often a halide salt solution, with the difference between the two being the concentration of ions in the particular desiccant flow stream—the high concentration liquid desiccant 210 having a salt ion concentration of 35 wt %, and the low concentration liquid desiccant 224 having a salt ion concentration of 15 wt %, when both desiccants enter the heat and mass exchanger. The halide salt can be selected from sodium chloride (NaCl), potassium chloride (KCl), potassium iodide (KI), lithium chloride (LiCl), copper(II) chloride ($CuCl_2$), silver chloride (AgCl), calcium chloride ($CaCl_2$), chlorine fluoride (ClF), bromomethane ($CH_3Br$), iodoform ($CHI_3$), hydrogen chloride (HCl), lithium bromide (LiBr), hydrogen bromide (HBr), and combinations thereof. In some embodiments, the halide salt solution is selected from LiCl and $CaCl_2$. In some embodiments, the halide salt solution is LiCl. The desiccant can also be potassium acetate or 1-Ethyl-3-methylimidazolium acetate (CAS number 143314-17-4).

In this embodiment, the water 272 removed from the inlet supply air 270 moves directly into the high concentration desiccant stream 210. In contrast, water 280 is removed from the low concentration desiccant stream 224 into the exhaust or purge air stream 282, which is them removed from the integrated system. As shown in FIG. 2, the flow of the desiccant streams 210 and 224 overlap, or operate in a quasi-figure-8 pattern, with the low concentration desiccant stream 224 being processed via electrolysis to become the high concentration desiccant stream 210, and vice versa. By bringing water 272 into the system of this embodiment via the high concentration desiccant stream 210, the disclosed system reclaims water from the inlet supply air 270 for use in cooling and dehumidifying more inlet supply air 270 in subsequent operational cycles. Doing so allows the system of this embodiment to utilize less water from municipal sources, easing environmental impacts.

In a third embodiment, with reference to FIG. 2, the present disclosure provides a method of cooling and dehumidifying inlet supply air 270, comprising:

in the heat and mass exchanger 200, moving humidified inlet supply air 270 through a first flow channel 290 and a high concentration fluid desiccant 210 through a second flow channel 292 along opposite sides of a first vapor permeable membrane 274;

in the heat and mass exchanger 200, moving a low concentration fluid desiccant 224 through a third flow channel 294 and an exhaust air stream 282 through a fourth flow channel 296 along opposite sides of a second vapor permeable membrane 278, wherein a vapor impermeable separation wall 276 separates the second 292 and third 294 flow channels;

outputting the inlet supply air 270 from the heat and mass exchanger 200;

moving the high concentration fluid desiccant 210 and the low concentration fluid desiccant 224 out of the heat and mass exchanger 200 and into the electrodialysis stack 202; and recycling the high concentration fluid desiccant 210 and the low concentration fluid desiccant 224 for further use in the second flow channel 292 and third flow channel 294, respectively;

wherein:

water vapor 272 moves from the humidified inlet supply air 270 across the first membrane 274 into the high concentration fluid desiccant 210, dehumidifying the inlet supply air 270;

heat 278 moves across the separation wall 276 from the high concentration fluid desiccant 210 into the low concentration fluid desiccant 224, cooling the inlet supply air 270;

water vapor 280 moves from the low concentration fluid desiccant 224 across the second water-permeable membrane 278 into the exhaust air stream 282; and in the electrolysis stack 202, prior to recycling, the high concentration fluid desiccant 210 is processed to become the low concentration fluid desiccant 224 and the low concentration fluid desiccant 224 is processed to become the high concentration fluid desiccant 210.

In this embodiment, in the electrolysis stack 202, processing of the high concentration fluid desiccant 210 comprises:

splitting the high concentration fluid desiccant 210 stream into two streams of high concentration fluid desiccant 216 and 218;

moving cations away from the two streams of high concentration fluid desiccant 216 and 218 across two cation permeable membranes 256 and 260 via electrolysis, and moving anions away from the two streams of high concentration fluid desiccant 216 and 218 across two anion permeable membranes 254 and 258, creating two streams of low concentration fluid desiccant 220 and 224; and combining the two streams of low concentration fluid desiccant 220 and 224, creating the low concentration fluid desiccant 224 stream.

In this embodiment, in the electrolysis stack 202, processing of the low concentration fluid desiccant 224 comprises:

splitting the low concentration fluid desiccant 224 stream into three streams of low concentration fluid desiccant 230, 232 and 234;

moving cations into the three streams of low concentration fluid desiccant 230, 232 and 234 across three cation permeable membranes 252, 256 and 260 via electrolysis, and moving anions into the three streams of low concentration fluid desiccant 230, 232 and 234 across three anion permeable membranes 254, 258 and 262 via electrolysis, creating three streams of high concentration fluid desiccant 236, 238 and 240; and combining the three streams of high concentration fluid desiccant 236, 238 and 240, creating the high concentration fluid desiccant 210 stream.

In this embodiment, in the electrodialysis stack 202 prior to recycling, the two streams of high concentration fluid desiccant 216 and 218 are intercalated between the three streams of low concentration fluid desiccant 230, 232 and 234, along opposite sides of a series of alternating cation and anion permeable membranes. In some embodiments, the order of the alternating cation and anion permeable membranes is cation permeable membrane 252, anion permeable membrane 254, cation permeable membrane 256, anion permeable membrane 258, cation permeable membrane 260 and anion permeable membrane 262.

As shown in FIG. 2, cations and anions move from the two streams of high concentration fluid desiccant 216 and 218, across the ion-permeable membranes, into the three streams of low concentration fluid desiccant 230, 232 and 234, via electrolysis as described above. The concentration of ions in the two streams of high concentration fluid desiccant 216 and 218 become reduced and the concentration of ions in the three streams of low concentration fluid desiccant 230, 232 and 234 increase. The result of the electrodialysis is that the high concentration liquid desiccant 210, after leaving the second flow channel 292 is converted into the low concentration liquid desiccant 224 via electrolysis and moved back to the third flow channel 294. The integration of the heat and mass exchanger 200 with the electrodialysis stack 202 allows for the two liquid desiccant streams to be exchanged for one another during the processing of the inlet supply air 270. This allows for repeated reuse of both desiccant streams, as volume and ionic content are moved back and forth between the liquid desiccant streams, while using less electricity. The end result is an integrated system that is more energy efficient than indirect evaporative cooling and dehumidification systems currently on the market.

Additionally, in this embodiment the low concentration liquid desiccant 224 and high concentration liquid desiccant 210 are each the same halide salt solution. As shown in FIG. 2, the flow of the desiccant streams 210 and 224 overlap, or move through the disclosed system depicted in FIG. 2 in a continuous quasi-figure-8 pattern, with the low concentration desiccant stream 224 being processed to become the high concentration desiccant stream 210, and vice versa. Because of that, both desiccant streams are made of the same solution, often a halide salt solution, with the difference between the two being the concentration of ions in the particular desiccant flow stream—the high concentration liquid desiccant 210 having a salt ion concentration of 35 wt %, and the low concentration liquid desiccant 224 having a salt ion concentration of 15 wt %, when both desiccants enter the heat and mass exchanger. The halide salt can be selected from sodium chloride (NaCl), potassium chloride (KCl), potassium iodide (KI), lithium chloride (LiCl), copper(II) chloride ($CuCl_2$), silver chloride (AgCl), calcium chloride ($CaCl_2$), chlorine fluoride (ClF), bromomethane ($CH_3Br$), iodoform ($CHI_3$), hydrogen chloride (HCl), lithium bromide (LiBr), hydrogen bromide (HBr), and combinations thereof. In some embodiments, the halide salt solution is selected from LiCl and $CaCl_2$). In some embodiments, the halide salt solution is LiCl. The desiccant can also be potassium acetate or 1-Ethyl-3-methylimidazolium acetate (CAS number 143314-17-4).

In this embodiment, the water 272 removed from the inlet supply air 270 moves directly into the high concentration desiccant stream 210. In contrast, water 280 is removed from the low concentration desiccant stream 224 into the exhaust or purge air stream 282, which is them removed from the integrated system. As shown in FIG. 2, the flow of the desiccant streams 210 and 224 overlap, or operate in a quasi-figure-8 pattern, with the low concentration desiccant stream 224 being processed via electrolysis to become the high concentration desiccant stream 210, and vice versa. By bringing water 272 into the system of this embodiment via the high concentration desiccant stream 210, the disclosed system reclaims water from the inlet supply air 270 for use in cooling and dehumidifying more inlet supply air 270 in subsequent operational cycles. Doing so allows the system of this embodiment to utilize less water from municipal sources, easing environmental impacts.

Figure 3:
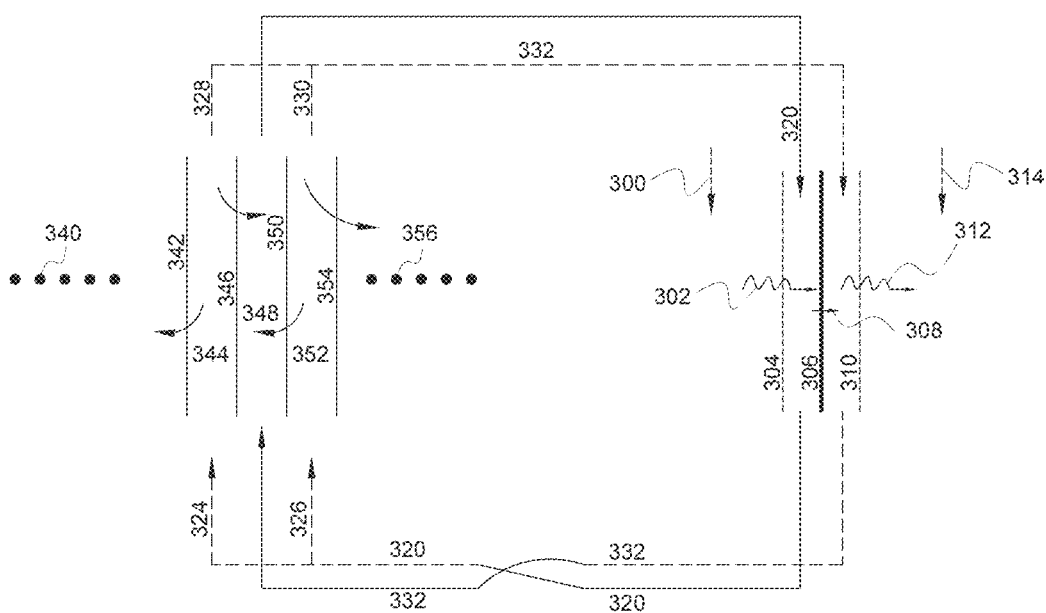
FIG. 3 illustrates, in schematic form, yet another cooling and dehumidification system provided by embodiments of the present disclosure. The embodiment depicted represents a general configuration of an integrated, continuous system comprising both a heat and mass exchanger and an electrolysis stack.

In a fourth embodiment, the present disclosure provides yet another system for cooling and dehumidifying air as provided in FIG. 3. In this embodiment, a process air stream 300 is moved through a heat and mass exchanger along a first side of a vapor permeable membrane 304. A high concentration liquid desiccant 320 is also moved through the heat and mass exchanger, along a second side of the vapor permeable membrane 304. The process air stream 300 and the high concentration liquid desiccant 320 are separated by the first vapor permeable membrane 304. Water vapor 302 flows across the first vapor permeable membrane 304 from the process air stream 300 into the high concentration liquid desiccant 320. The high concentration liquid desiccant 320 is thereby diluted by water vapor 302 from the first process air stream 300, where it is then moved from the heat and mass exchanger to an electrolysis stack. The result is that the process airstream is dehumidified.

A purge air stream 314 is received and flows through the heat and mass exchanger along a first side of a second water vapor permeable membrane 310. A low concentration liquid desiccant 332 also flows through the heat and mass exchanger, along a second side of the second water vapor permeable membrane 310. The coolant air stream 314 and the low concentration liquid desiccant 332 are separated by the second vapor permeable membrane 310. Water vapor 312 flows across the second vapor permeable membrane 310 from the low concentration liquid desiccant 332 into the purge air stream 314. The low concentration liquid desiccant 332 therefore becomes more concentrated by evaporation of water vapor 312 from the low concentration liquid desiccant 332 into the purge air stream, where it is then moved to an electrodialysis stack.

In the heat and mass exchanger, the high concentration liquid desiccant 320 and the low concentration liquid desiccant 332 are separated by a water vapor impermeable barrier 306. Heat 308 from the high concentration fluid desiccant 320 moves across the barrier 306 into the low concentration fluid desiccant 332. The result is the cooling of the inlet air 300.

At the electrolysis stack, the high concentration liquid desiccant 320 from the heat and mass exchanger is split into two high concentration streams, 324 and 326, and flowed into separate channels of the electrodialysis stack 344 and 352. During electrolysis, the electrodialysis stack removes ions from the high concentration streams 324 and 326, producing streams 328 and 330, which contain low concentrations of ions. Low concentration streams 328 and 330 are then combined to generate the low concentration liquid desiccant 332, which is recycled back to the heat and mass exchanger.

Additionally, at the electrolysis stack the low concentration liquid desiccant 332 from the heat and mass exchanger is flowed into a single, central channel 348 of the electrodialysis stack that is located between channels 344 and 352. During electrolysis, the electrodialysis stack moves ions into the central channel 348, generating the high concentration liquid desiccant 320, which is recycled back to the heat and mass exchanger.

Ions move out of channels 344 and 352, and into channel 348, by passing across ion permeable membranes 342, 346, 350 and 354. In electrolysis, ions will move in accordance with the electrical current imparted into the stack—with cations moving away from the cathode and toward the anode, anions moving away from the anode and toward the cathode. In the depicted embodiment, structure 340 can be either the cathode or the anode, depending upon the desired configuration of the electrodialysis stack. Similarly, structure 356 can be either the cathode or the anode. As a person of skill in the art will know, when structure 340 is a cathode, structure 356 is an anode. Similarly, when structure 340 is an anode, structure 356 is a cathode. Additional electrodialysis flow channels and membranes can be placed between the anode and cathode, and multiple electrodialysis stacks can be arranged in series. For example, two, three, four, five, six, seven, eight, nine, ten, eleven, twelve, thirteen, fourteen, fifteen, sixteen, seventeen, eighteen, nineteen, twenty, or more electrodialysis stacks can be arranged in series.

In this embodiment, the low concentration liquid desiccant 332, after leaving the heat and mass exchanger, is moved to the electrodialysis stack where it is subjected to electrodialysis. The result of that electrodialysis is that the low concentration liquid desiccant 332 is then converted into the high concentration liquid desiccant 320 and moved back to the heat and mass exchanger. Likewise, the high concentration liquid desiccant 320, after leaving the heat and mass exchanger, is moved to the electrodialysis stack where it is subjected to electrodialysis. The result of that electrodialysis is that the high concentration liquid desiccant 320 is then converted into the low concentration liquid desiccant 332 and moved back to the heat and mass exchanger. The integration of the heat and mass exchanger with the electrodialysis stack allows for the two liquid desiccant streams to be exchanged for one another during the processing of the inlet supply air 300. This allows for repeated reuse of both desiccant streams, as volume and ionic content are moved back and forth between the liquid desiccant streams, while using less electricity. The end result is an integrated system that is more energy efficient than indirect evaporative cooling and dehumidification systems currently on the market.

Additionally, in this embodiment the low concentration liquid desiccant 332 and high concentration liquid desiccant 320 are each the same halide salt solution. As shown in FIG. 3, the flow of the desiccant streams 320 and 332 overlap, or move through the disclosed system depicted in FIG. 3 in a continuous quasi-figure-8 pattern, with the low concentration desiccant stream 332 being processed to become the high concentration desiccant stream 320, and vice versa. Because of that, both desiccant streams are made of the same solution, often a halide salt solution, with the difference between the two being the concentration of ions in the particular desiccant flow stream—the high concentration liquid desiccant 320 having a salt ion concentration of 35 wt %, and the low concentration liquid desiccant 332 having a salt ion concentration of 15 wt %, when both desiccants enter the heat and mass exchanger. The halide salt can be selected from sodium chloride (NaCl), potassium chloride (KCl), potassium iodide (KI), lithium chloride (LiCl), copper(II) chloride ($CuCl_2$), silver chloride (AgCl), calcium chloride ($CaCl_2$), chlorine fluoride (ClF), bromomethane ($CH_3Br$), iodoform ($CHI_3$), hydrogen chloride (HCl), hydrogen bromide (HBr), lithium bromide (LiBr), and combinations thereof. In some embodiments, the halide salt solution is selected from LiCl and $CaCl_2$. In some embodiments, the halide salt solution is LiCl. The desiccant can also be potassium acetate or 1-Ethyl-3-methylimidazolium acetate (CAS number 143314-17-4).

In this embodiment, the water 302 removed from the inlet supply air 300 moves directly into the high concentration desiccant stream 320. In contrast, water 312 is removed from the low concentration desiccant stream 332 into the exhaust or purge air stream 314, which is them removed from the integrated system. As shown in FIG. 3, the flow of the desiccant streams 320 and 332 overlap, or operate in a quasi-figure-8 pattern, with the low concentration desiccant stream 332 being processed via electrolysis to become the high concentration desiccant stream 320, and vice versa. By bringing water 302 into the system of this embodiment via the high concentration desiccant stream 320, the disclosed system reclaims water from the inlet supply air 300 for use in cooling and dehumidifying more inlet supply air 300 in subsequent operational cycles. Doing so allows the system of this embodiment to utilize less water from municipal sources, easing environmental impacts.

Figure 4:
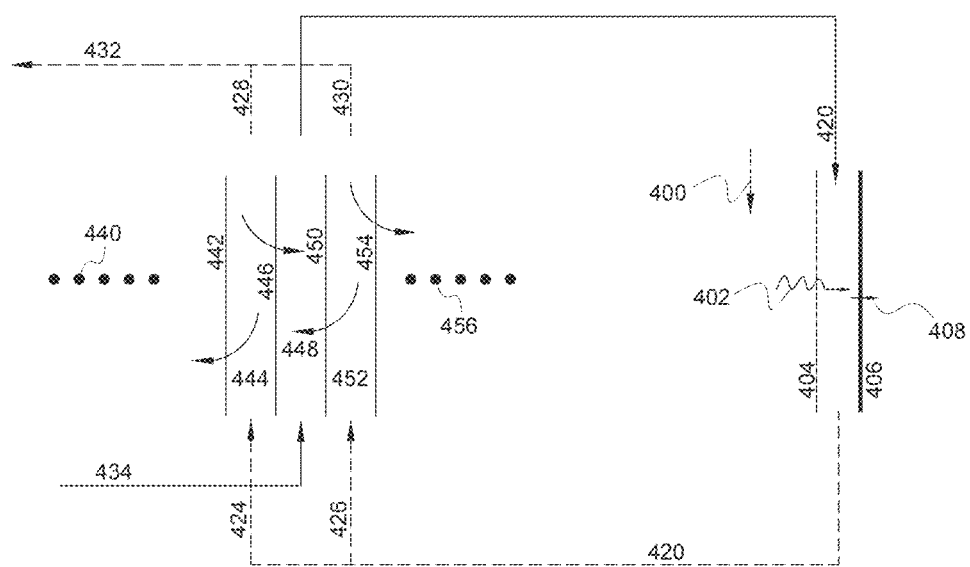
FIG. 4 illustrates, in schematic form, portions of a dehumidification system that perform water absorption, which occurs in a heat and mass exchanger, and ion separation/desiccant concentration, which occurs in an electrodialysis stack.
Figure 5:
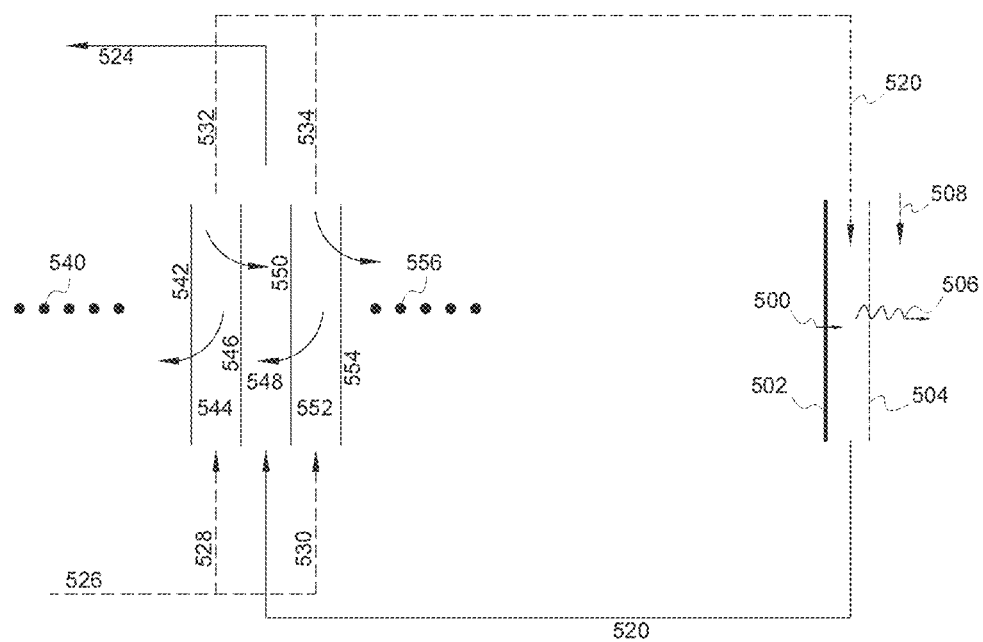
FIG. 5 illustrates, in schematic form, portions of a dehumidification system that perform cooling, that occur in a heat and mass exchanger, and ion separation/desiccant dilution, which occur in an electrodialysis stack.

FIGS. 4 and 5 depict a fifth embodiment of a dehumidification system provided by the present disclosure, illustrating yet other examples of water absorption (occurring in a heat and mass exchanger) and ion separation (occurring in an electrodialysis stack). In this embodiment, the processes depicted in FIG. 4 can occur apart from the processes depicted in FIG. 5. Such processes may be split between distinct structures within a closed, integrated system. The depicted embodiments of FIGS. 4 and 5 do not occur in a continuous loop with each other, though they could be adjusted for such operation. Rather, the depicted embodiments of FIGS. 4 and 5 are performed in two complimentary but distinct loops.

In the portion of this embodiment provided in FIG. 4, the process of water absorption involves the movement of humidity 402, in the form of water vapor, from process air 400, across a vapor permeable membrane 404, to a liquid desiccant 420 and heat 408 from the liquid desiccant 420 moves across a water vapor impermeable barrier 406, to a coolant side (such as that depicted, for example, in FIG. 5).

Process air 400 flows along one side of a vapor permeable membrane 404 that separates the air from a desiccant stream 420 flowing on the other side of the membrane 404. In some embodiments, the desiccant stream 420 contains a high concentration of salt ions, making it a high concentration desiccant stream 420. Humidity (water vapor) 402 flows across the membrane 404 from the process air 400 to the high concentration desiccant stream 420. On the opposite side of the flow channel containing the high concentration liquid desiccant 420 is a barrier 406 that is impermeable to water vapor, but that will allow for the free transfer of energy in the form of heat. In the depicted embodiment, heat 408 flows across the barrier 406 from the high concentration desiccant stream 420 to a coolant side. Once the water 402 is moved from the process air 400 into the high concentration liquid desiccant 420, the desiccant 420 is moved from the heat and mass exchanger to the electrodialysis stack.

In this embodiment, water 402 is removed from the inlet supply air 400 and moved into the high concentration desiccant stream 420. The disclosed system is therefore capable of claiming water directly from the inlet supply air 400 for use in cooling and dehumidifying more inlet supply air 400 in subsequent operational cycles. Doing so allows the system of this embodiment to utilize less water from municipal sources, easing environmental impacts.

At the electrodialysis stack, the high concentration desiccant stream 420 is split into high concentration streams 424 and 426 that flow into channels 444 and 452. A flow of a fluid desiccant containing a low concentration of salt ions 434 is brought from another location (not shown) and moved into central channel 448, located between channels 444 and 452. During electrolysis, the electrodialysis stack moves ions into the central channel 448, generating the high concentration liquid desiccant 420, which is recycled back to the heat and mass exchanger.

Ions move out of channels 444 and 452, and into channel 448, by passing across ion permeable membranes 442, 446, 450 and 454, in the directions depicted by the curved arrows. In electrolysis, ions will move in accordance with the electrical current imparted into the stack—with cations moving away from the cathode and toward the anode, anions moving away from the anode and toward the cathode. In the depicted embodiment, structure 440 can be either the cathode or the anode, depending upon the desired configuration of the electrodialysis stack. Similarly, structure 456 can be either the cathode or the anode. As a person of skill in the art will know, when structure 440 is a cathode, structure 456 is an anode. Similarly, when structure 440 is an anode, structure 456 is a cathode. Additional electrodialysis flow channels and membranes can be placed between the anode and cathode, and multiple electrodialysis stacks can be arranged in series. For example, two, three, four, five, six, seven, eight, nine, ten, eleven, twelve, thirteen, fourteen, fifteen, sixteen, seventeen, eighteen, nineteen, twenty, or more electrodialysis stacks can be arranged in series.

In this embodiment, the fluid desiccant containing a low concentration of salt ions 434 becomes highly concentrated with salt ions as a result of electrodialysis, becoming the high concentration liquid desiccant 420 that is moved back to the heat and mass exchanger for subsequent processing cycles.

High concentration streams 424 and 426 lose salt ions during electrolysis, becoming low concentration streams 428 and 430, which are combined into a low concentration fluid desiccant 432 that is moved to another part of the system for use as a low concentration liquid desiccant in another portion of the integrated system.

Additionally, in this embodiment the fluid desiccant containing a low concentration of salt ions 434 and the high concentration liquid desiccant 420 are each the same halide salt solution. The system depicted in FIG. 4 represents a portion of a closed system whereby the fluid desiccant containing a low concentration of salt ions 434 is processed to become the high concentration desiccant stream 420. To ensure consistent operability, the salt solutions must be the same solution, often a halide salt solution, with the difference between the two being the concentration of ions in the particular desiccant flow stream—the high concentration liquid desiccant 420 having a salt ion concentration of 35 wt %, and the low concentration liquid desiccant 432 having a salt ion concentration of 15 wt %, when both desiccants enter a heat and mass exchanger. The halide salt can be selected from sodium chloride (NaCl), potassium chloride (KCl), potassium iodide (KI), lithium chloride (LiCl), copper(II) chloride ($CuCl_2$), silver chloride (AgCl), calcium chloride ($CaCl_2$), chlorine fluoride (ClF), bromomethane ($CH_3Br$), iodoform ($CHI_3$), hydrogen chloride (HCl), lithium bromide (LiBr), hydrogen bromide (HBr), and combinations thereof. In some embodiments, the halide salt solution is selected from LiCl and $CaCl_2$). In some embodiments, the halide salt solution is LiCl. The desiccant can also be potassium acetate or 1-Ethyl-3-methylimidazolium acetate (CAS number 143314-17-4).

In the portion of this embodiment provided in FIG. 5, the process of water cooling involves the movement of heat 500, across a water vapor impermeable barrier 502, into a liquid desiccant 520. Water vapor 506 from the liquid desiccant 520 moves across a vapor permeable membrane 504, to a flow of purge or coolant air 508. The heat 500 can come from a water absorption process, such as that depicted in FIG. 4.

In some embodiments, the desiccant stream 520 contains a low concentration of salt ions, making it a low concentration desiccant stream 520. The low concentration fluid desiccant 520 flows along one side of the vapor permeable membrane 504 that separates the desiccant stream 520 from a flow of purge or coolant air 508 flowing on the other side of the membrane 504. Humidity (water vapor) 506 flows across the membrane 504 from the low concentration fluid desiccant 520 to the purge or coolant air 508. On the opposite side of the flow channel containing the low concentration liquid desiccant 520 is a barrier 502 that is impermeable to water vapor, but that will allow for the free transfer of energy in the form of heat. In the depicted embodiment, heat 500 flows across the barrier 502 from a water absorption side into the low concentration desiccant stream 520. Once the water 402 is moved from the low concentration liquid desiccant 520, the desiccant 520 is moved from the heat and mass exchanger to the electrodialysis stack.

At the electrodialysis stack, a first flow of fluid desiccant containing a high concentration of salt ions 526 is brought from another location (not shown) and split into high concentration streams 528 and 530 that flow into channels 544 and 552. The low concentration fluid desiccant 520 coming from the heat and mass exchanger is moved into central channel 548, located between channels 544 and 552. During electrolysis, the electrodialysis stack moves ions into the central channel 548, generating a second flow of fluid desiccant containing a high concentration of salt ions 524, which is moved to another portion of the closed, integrated system.

During electrolysis, high concentration streams 528 and 530 lose salt ions, becoming low concentration streams 532 and 534. Those streams are combined to form the low concentration fluid desiccant 520, that is then recycled to the heat and mass exchanger for further processing rounds.

Ions move out of channels 544 and 552, and into channel 548, by passing across ion permeable membranes 542, 546, 550 and 554, in the directions depicted by the curved arrows. In electrolysis, ions will move in accordance with the electrical current imparted into the stack—with cations moving away from the cathode and toward the anode, anions moving away from the anode and toward the cathode. In the depicted embodiment, structure 540 can be either the cathode or the anode, depending upon the desired configuration of the electrodialysis stack. Similarly, structure 556 can be either the cathode or the anode. As a person of skill in the art will know, when structure 540 is a cathode, structure 556 is an anode. Similarly, when structure 540 is an anode, structure 556 is a cathode. Additional electrodialysis flow channels and membranes can be placed between the anode and cathode, and multiple electrodialysis stacks can be arranged in series. For example, two, three, four, five, six, seven, eight, nine, ten, eleven, twelve, thirteen, fourteen, fifteen, sixteen, seventeen, eighteen, nineteen, twenty, or more electrodialysis stacks can be arranged in series.

Additionally, in this embodiment the fluid desiccant containing a high concentration of salt ions 526 and the low concentration liquid desiccant 520 each contain the same halide salt solution. To ensure consistent operability, the salt solutions must be the same solution, often a halide salt solution, with the difference between the two being the concentration of ions in the particular desiccant flow stream—the high concentration liquid desiccant 524 having a salt ion concentration of 35 wt %, and the low concentration liquid desiccant 520 having a salt ion concentration of 15 wt %, when both desiccants enter a heat and mass exchanger. The halide salt can be selected from sodium chloride (NaCl), potassium chloride (KCl), potassium iodide (KI), lithium chloride (LiCl), copper(II) chloride ($CuCl_2$), silver chloride (AgCl), calcium chloride ($CaCl_2$), chlorine fluoride (ClF), bromomethane ($CH_3Br$), iodoform ($CHI_3$), hydrogen chloride (HCl), lithium bromide (LiAr), hydrogen bromide (HBr), and combinations thereof. In some embodiments, the halide salt solution is selected from LiCl and $CaCl_2$. In some embodiments, the halide salt solution is LiCl. The desiccant can also be potassium acetate or 1-Ethyl-3-methylimidazolium acetate (CAS number 143314-17-4).

EXPERIMENTAL EXAMPLES

Experimental Example 1

Figure 6:
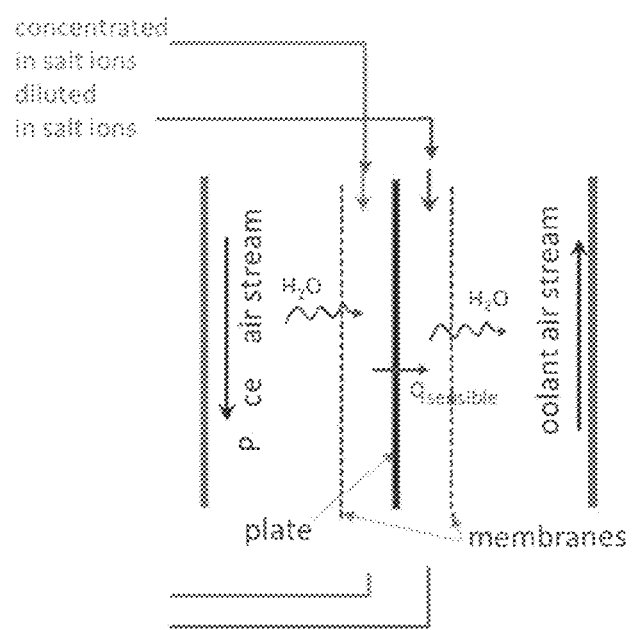
FIG. 6 illustrates, in schematic form, a generalized heat and mass exchanger, demonstrating the flow of fluid simultaneously into a high salt solution concentration desiccant and out of a low salt solution concentration desiccant.

FIG. 6 depicts a heat and mass exchanger consistent with embodiments provided by the present disclosure. FIG. 6 shows, on the left hand side of the "plate," how water vapor can diffuse through a membrane and be absorbed into a concentrated salt solution desiccant stream. On the right hand side of the "plate," water is evaporated from the diluted salt solution desiccant stream through a membrane into a separate airstream. The salt solution with the lower concentration (right hand side of the "plate") has a higher vapor pressure, and therefore can evaporate water into the coolant air stream while water vapor is removed from the process air stream and absorbed into the high-concentration salt solution. The absorption and evaporation occur simultaneously and setup a strong driving force for heat transfer from the high-concentration solution to the low-concentration solution. As provided herein, a heat and mass exchanger such as that depicted in FIG. 6 can serve as a part of an integrated system, that also includes one or more electrolysis stacks for electrochemical regeneration using ion transfer to concentrate the desiccant, wherein the mass and heat exchanger provides a 4-fluid absorber to reject water from the diluted desiccant stream. The four fluids being a process air stream, a high concentration salt solution fluid desiccant, a low concentration salt solution fluid desiccant, and a purge or coolant air stream.

Experimental Example 2

Electrodialysis or other ion-separation technologies are a promising regeneration method, where salt ions and water molecules are separated without energy intensive liquid/vapor phase change. The process removes ions from an already-dilute desiccant stream and transports the ions, across ion exchange membranes, to further concentrate a strong desiccant stream. Both streams can be stored for later use. Electrodialysis is common for desalination and wastewater treatment, but not for high-concentration desiccants useful in the systems and methods provided by the present disclosure. Existing research has looked solely at energy to drive moisture from one concentration to another, but not how to integrate electrodialysis into a liquid-desiccant cycle.

Figure 7:
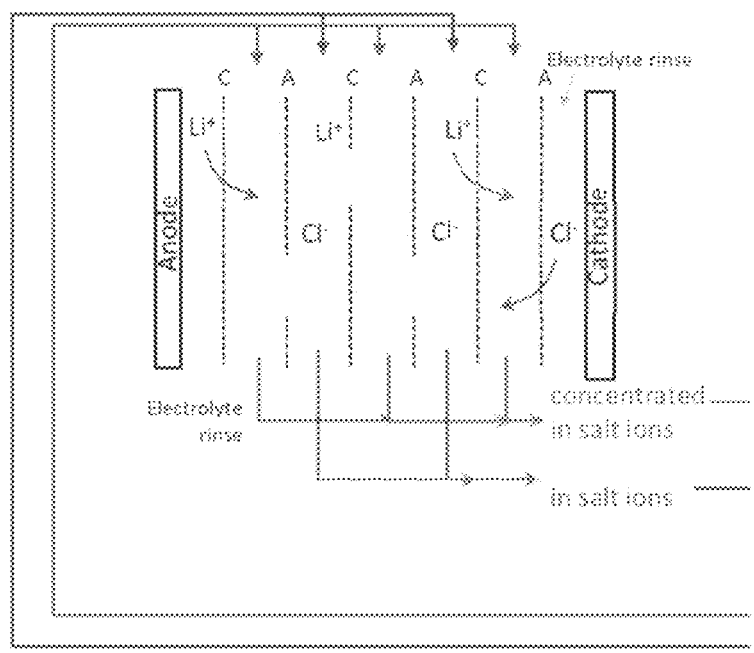
FIG. 7 illustrates, in schematic form, a generalized electrodialysis stack.

Electrochemical regeneration as it was known to occur prior to the filing of the instant application is shown in FIG. 7, where positive and negative ions move across a cation and anion membrane to create concentrated and diluted liquid streams. However, to discharge the diluted stream from prior art electrochemical regeneration methods requires very low concentration desiccants, such that they can be disposed of down the drain (nearly pure water), like condensate is for standard vapor compression air conditioners. However, the performance of electrodialysis and other electrochemical processes degrade when working over large concentration gradients, particularly when the diluted stream is at very low concentrations. This is needed for desiccant regeneration, which produces 35% (by wt.) liquid desiccant.

In contrast, the approach disclosed herein generates a low-concentration desiccant stream (~15% by wt.), rather than pure water. The water is removed by directing the low-concentration solution to the cooling side of a 4-fluid dehumidifier (shown in FIG. 6), where it evaporates and cools the concentrated desiccant stream, removing the heat of absorption from the desiccant. Electrodialysis has not been explored previously between high (~35% by wt.) and moderate (~15% by wt.) concentration fluid desiccants; the present disclosure provides systems utilizing fluid desiccant streams having these concentrations. As set forth above, this can be achieved using multi-stage electrochemical deionization systems, which lower the concentration gradients across the membrane by distributing this gradient across several ion transport stages.

Figure 8:
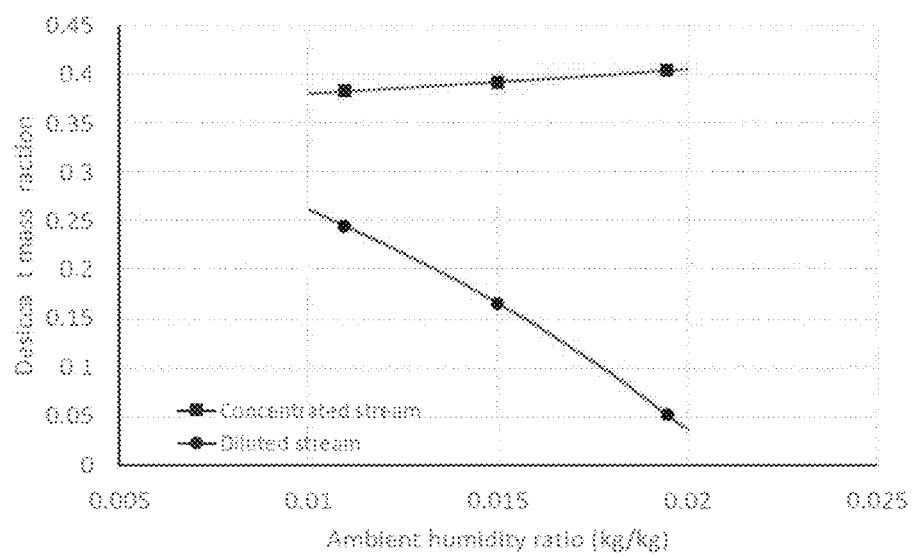
FIG. 8 shows concentrations of desiccant streams when using the absorber shown in the heat and mass exchanger of FIG. 6, for a range of ambient air humidity. The figure shows high efficiency dehumidification even when the concentration difference between the two liquid desiccant streams is small.

A model of the absorber was created, showing how the difference in concentration can be lowered for this process. The results of the modeling are shown in FIG. 8. Depending on the ambient humidity, the concentration difference can be very small, drastically increasing efficiency. Even at high ambient air humidity, the diluted stream is still far from pure water (which would be required for discharge down the drain), and allows for a more efficient electrochemical process, with much fewer stages.

To predict the required concentration of the desiccant streams, a model of the four fluids shown in FIG. 2 was built: two airstreams and two desiccants streams. The two air channels are approximately 3 mm wide, and the desiccant channels are approximately 0.5 mm wide. A 20-micron porous membrane is used between the desiccant and air. The model assumes a crossflow geometry with the following flow directions:

High-concentration desiccant—vertical downward
Low-concentration desiccant—vertical downward
Process air stream—horizontal
Coolant air stream—vertical downward The model is a finite-difference model that calculates the heat and mass transfer between the four fluids at each node within the device. There are 15 nodes in the horizontal direction, and 8 nodes in the vertical direction. Heat and mass transfer coefficients are calculated for each fluid based on correlations from the literature, including for water vapor diffusion across the membrane. Membranes can be included on both liquid desiccant streams, neither, or some combination.

Figure 9:
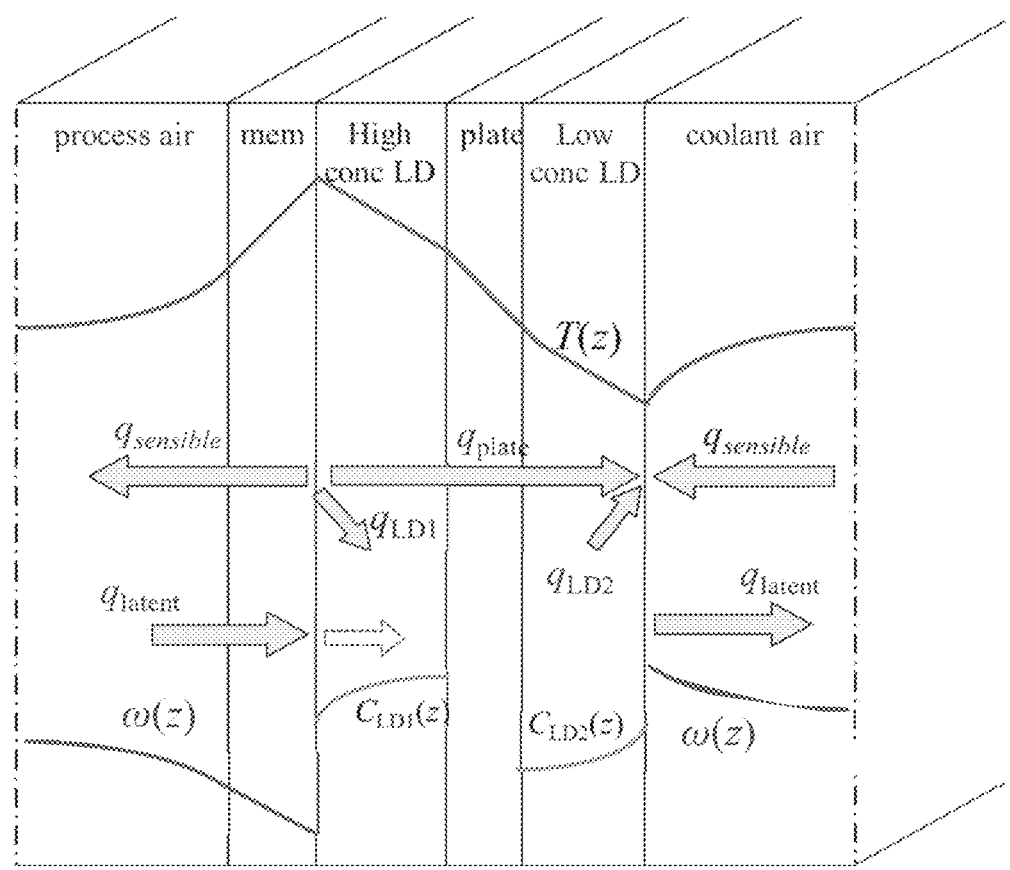
FIG. 9 illustrates heat transfer flows between different fluids of the model described in Example 2. LD=liquid desiccant, $\omega$=humidity ratio, q=heat transfer (sensible or latent), Jv=mass flux into desiccant.

To The heat and mass transfer flows between the different streams is shown in FIG. 9, along with the temperature, humidity, and concentration profiles. The low vapor pressure of the desiccant on the process side sets up a humidity driving potential from the air to the desiccant. The absorption of the water vapor into the desiccant releases the enthalpy of vaporization, heating the desiccant. The heat in that desiccant is then transferred to the process airstream and across the plate into the low-concentration liquid desiccant. Water vapor is evaporating from this second desiccant stream, which absorbs heat. This cools the coolant airstream and also the high-concentration desiccant across the plate. Concentration polarization within the desiccant film is also calculated using an estimate for the mass transfer coefficient for water molecules to diffuse inside the desiccant film.

The model calculates the outlet temperature and the outlet concentration or humidity using an iterative solver in the Engineering Equation Solver program. The model has the following independent variables:

flow rate of liquid desiccant (4 L/min)
desiccant inlet temperature (30 C)
Return air temperature (27 C)
Return air inlet humidity ratio (11.1 g/kg)
Process and coolant side airflow rates (3400 $m^3$/hr)
Inlet coolant air temperature (35 C)
Inlet coolant air humidity ratio (ranging from 10 g/kg to 20 g/kg)
Note: the process side inlet temperature and humidity is calculated assuming 30% ventilation air (30% outdoor air (which matches the coolant air) and 70% return air).

The outlet humidity ratio is specified in the model (8 g/kg), and then it is run for different inlet humidity ratios. The model solves for the required concentrations on the strong and weak side to deliver the required outlet humidity ratio, and so that the water evaporation rate on the coolant airstream matches the water vapor absorption rate on the process side. This ensures a mass balance on the water coming into and going out of the system.

The modeling results are shown in FIG. 8. This shows how the concentration is much higher than that required for disposing of the diluted stream down the drain (mass fraction <0.0002). The higher the mass fraction of the diluted stream, the less energy the electrodialysis regenerator will use.

Experimental Example 3

FIG. 1 shows how three electrodialysis stacks integrate with a heat and mass exchanger so that desiccant flows in a continuous stream. As shown at the top of FIG. 1, the high concentration liquid desiccant 150 is at the most concentrated state when it is entering the second flow channel 196, where the concentrations mass of salt per mass of solution is about 35% salt concentration by weight. The process continues as follows:

On the process side/left side of plate 182, the high concentration fluid desiccant 150 absorbs water from the process air 180, dropping in concentration from 35% salt concentration by weight to 30% salt concentration by weight when it leaves the second flow channel 196.

In electrodialysis stack 106, the high concentration fluid desiccant 150, as it moves through the fifth electrodialysis flow channel 194, gives up ions 174 across membrane 175, further dropping in salt concentration from 30% salt by weight (as it enters channel 194) to 25% salt by weight as it leaves channel 194, leaving as a first stream of intermediate low concentration liquid desiccant 154; and In contrast, second intermediate high concentration liquid desiccant stream 164, moving in the sixth electrodialysis flow channel 195 increases in salt concentration from 30% when it enters the channel 195 to 35% when it exits flow channel 195 as the now recycled high concentration liquid fluid desiccant stream 150.

In electrodialysis stack 104, the intermediate/low concentration fluid desiccant 154, as it moves through the third electrodialysis flow chamber 192, gives up ions 172 across membrane 173, further dropping in salt concentration from 25% salt by weight (as it enters channel 192) to 20% salt by weight as it leaves channel 192, leaving as a second stream of intermediate low concentration liquid desiccant 156; and In contrast, first intermediate high concentration liquid desiccant stream 162, moving in the fourth electrodialysis flow channel 193 increases in salt concentration from 25% when it enters the channel 193 to 30% when it exits flow channel 193 as the second intermediate high concentration liquid desiccant 164.

In electrodialysis stack 102, the second stream of intermediate low concentration liquid desiccant 156, as it moves through flow chamber 190, gives up ions 170 across membrane 171, further dropping in salt concentration from 20% salt by weight (as it enters channel 190) to 15% salt by weight as it leaves channel 190, leaving as the now recycled low concentration fluid desiccant stream 158; and In contrast, the low concentration fluid desiccant stream 158 that left the third flow channel 1104 of the heat and mass exchanger 100 and is now moving through the second electrodialysis flow channel 191 increases in salt concentration from 20% when it enters flow channel 191 to 25% when it exits flow channel 191 as first intermediate high concentration liquid desiccant stream 162.

The recycled low concentration fluid desiccant 158 is moved back to the heat and mass exchanger 100, where it enters the third flow channel 1104. Water evaporates from the desiccant 158 into a coolant or exhaust airstream 199, which is then exhausted outside, concentrating the fluid desiccant 158 from 15% to 20% salt concentration by weight. This step also removes water from the system that was absorbed by the high concentration desiccant 150 in flow channel 196 of the heat and mass exchanger.

From the mass and heat exchanger 100, the low concentration fluid desiccant 158 enters electrodialysis stack 102 and is progressively concentrated as it progresses through the three electrodialysis stacks 102, 104 and 106 until it becomes the high concentration liquid desiccant 150.

The process can be modified to lower the concentration of the low concentration desiccant 158 to below 15% by adding more electrodialysis stacks.

Desiccant storage tanks can also be added at stream 150 (highest concentration) and stream 158 (lowest concentration). This allows the system to use electricity at times separate from the cooling demand and to store the two desiccant concentrations for later use. It also allows for changes in the average water content of the desiccant, such that the system volume can increase and decrease as the concentration changes.

The configuration in FIG. 1 reduces the concentration change across each electrodialysis stack. In the depicted embodiment, a 5% concentration change for the two streams is shown, with both streams entering at the same concentration. The maximum delta concentration across each electrodialysis stack is then only 5%, while the total change in concentration is 20% (35% to 15%). The change could also be reduced by expanding the number of electrodialysis stacks with the same total concentration change (e.g., 6 ED stacks over 20% would have a delta concentration of only 2.5% per ED stack).

Without the integration of the low concentration liquid desiccant stream 158 in channel 1104 into the heat and mass exchanger, which removes water from the desiccant stream 158 without added energy, an electrodialysis-based system using a liquid desiccant would need to dispose of the desiccant down the drain. This requires a very low concentration such that the salt ions do not contaminate the wastewater stream and is not depleted by removing ions from the system. Drinking water thresholds are ~0.2 parts per thousand, which also corresponds to about 1-2 kg of salt dumped into the wastewater stream per year, or about 6% of the total salt ions of the system lost per year. As such, the disclosed embodiments significantly advance the state of the art.

Experimental Example 4

To understand the energy impact of the disclosed integrated systems, it is useful to estimate the energy required to regenerate the desiccant from 30% mass fraction back to 35% mass fraction after absorbing water from the airstream. This was done using the calculations described below, with the results shown in FIG. 10.

Figure 10:
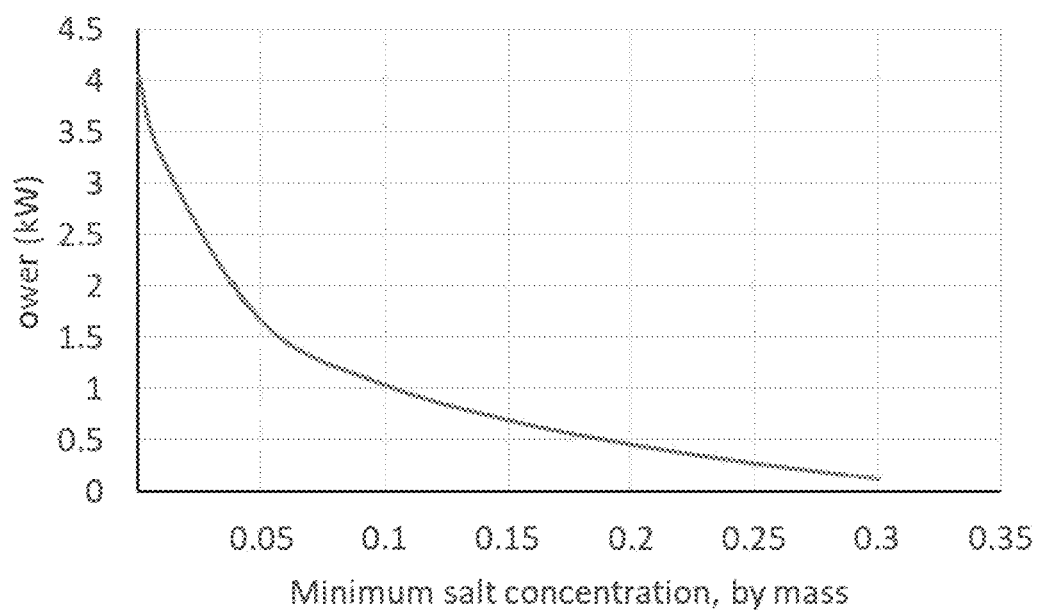
FIG. 10 shows the estimate electrical input to concentrate a desiccant stream to 35%, for the minimum concentration of the dilute stream.

The total power, in kW, is shown in FIG. 10 for a 1 L/min desiccant flow. Operating the disclosed systems uses between 0.5 and 1.5 kW, depending on the minimum concentration, whereas reducing the desiccant concentration to 0.2 parts per thousand, as required by the prior art systems, requires 4 kW. Thus, the disclosed systems use only 12-38% of the energy as a set of electrodialysis stacks alone.

In addition to the electricity savings, the disclosed systems improve the performance of the electrodialysis process for concentrating desiccant by:

Eliminating the disposal of LiCl (or other desiccant) ions into the municipal wastewater stream;

Eliminating loss of this desiccant from the system, which would need to be replaced;

Reducing the capital cost of the electrodialysis stacks by reducing the number of electrodialysis stacks required; and Providing cooling to the dehumidified airstream inherently in the process, through evaporation, which minimizes the cooling required to maintain desired outlet temperatures from the disclosed systems.

Energy Consumption Calculation:

The total energy consumption of the electrodialysis components of the manifold shown above is calculated by determining the power required for each unit, then summing these values. In each electrodialysis stack, a current of:

$$i_{ideal} = \frac{QF}{NA}(c_{out} - c_{in})$$

must be applied, where Q is the volumetric flow rate, F is Faraday's Constant, N is the number of CEM/AEM pairs in the stack, A is the cross-sectional surface area, and $$c_{in} = \frac{\omega_{LiCl}^{in} \rho_{H_2O}}{M_{LiCl}}$$

-continued $$c_{out} = \frac{\omega_{LiCl}^{out} \rho_{H_2O}}{M_{LiCl}}$$

are the inlet and (desired) outlet salt concentrations.

Assuming that most of the voltage drop arises due to ohmic losses (i.e., neglecting all junction potentials), the voltage input required can be found as:

$$\sum_k \Delta V_{ohm,k} = \sum_k IR_k = \sum_k i\frac{L_k}{\sigma_k}$$

The conductivity of each layer will change as a function of the salt stream concentrations, with lower concentrations leading to lower conductivities. Note that these results use dilute solution theory, which neglects ion-ion interactions, which could be considered when calculating the ohmic losses. Concentrated solution theory would predict a slight benefit of reducing the salt concentrations, as ion-ion "friction" would be reduced. However, this effect should be small compared to the concentration effect.

The ionic conductivity is a function of the local salt concentration and the species' diffusion coefficients:

$$\sigma_k = \sum_k \frac{F^2}{RT}(z_k^2)D_k c_k$$

If we assume local electroneutrality in the rinses, the total ionic conductivity becomes:

$$\sigma_{tot} = \frac{F^2 c}{RT}(D_{Li^+} + D_{Cl^-})$$

where c refers to the bulk rinse concentration, i.e., it can refer to $c_{in}$ or $c_{out}$.

Plugging in the conductivities to the voltage expression allows us to calculate the different potential drops required by each electrodialysis stack (A, B, and C in Table 1, below). Assuming N=20 for each stack, separation distances of 1 mm, and using a constant flow rate Q=1 L/min and area A=25 cm², the potentials required by each unit are:

TABLE 1

| Stack ID | ΔV (V) | P (kW) |
|---|---|---|
| A | 1.34 | 0.127 |
| B | 1.58 | 0.150 |
| C | 1.94 | 0.184 |

Thus, the total power required will be 0.461 kW for the example shown in the data of Table 1 ($\omega_{max}$=0.35, $\omega_{min}$=0.15). The units with more dilute streams require a higher applied voltage due to the lower conductivities. Assuming different number of modules can be used to calculate the power for different minimum concentrations, which provides the curve in FIG. 9.

Stated Examples

The following stated examples refer to embodiments of the systems and methods provided by the present disclosure:

Example 1. A dehumidification system, comprising:
a heat and mass exchanger;
at least one electrodialysis stack;
a high salt ion concentration liquid desiccant; and
a low salt ion concentration liquid desiccant;
wherein:
the high salt ion concentration liquid desiccant and the low salt ion concentration liquid desiccant are in a single, continuous stream that connects the heat and mass exchanger and the at least one electrodialysis stack;
the high salt ion concentration liquid desiccant absorbs water from a process air stream in the heat and mass exchanger and rejects salt ions to the low salt ion concentration liquid desiccant in the at least one electrodialysis stack; and
the low salt ion concentration liquid desiccant desorbs water from a purge air stream in the heat and mass exchanger and accepts ions from the high salt ion concentration liquid desiccant in the at least one electrodialysis stack.

Example 2. The dehumidification system of Example 1, wherein the high salt ion concentration liquid desiccant and the low salt ion concentration liquid desiccant comprise the same salt solution.

Example 3. The dehumidification system of Example 1 or Example 2, wherein the high salt ion concentration liquid desiccant and the low salt ion concentration liquid desiccant comprise a salt solution selected from sodium chloride, potassium chloride, potassium iodide, lithium chloride, copper(II) chloride, silver chloride, calcium chloride, chlorine fluoride, bromomethane, iodoform, hydrogen chloride, lithium bromide, hydrogen bromide, potassium acetate, 1-Ethyl-3-methylimidazolium acetate, and combinations thereof.

Example 4. The dehumidification system of Example 2 or Example 3, wherein the salt solution is selected from lithium chloride and calcium chloride.

Example 5. The dehumidification system of any one of Examples 2-4, wherein the salt solution is lithium chloride.

Example 6. The dehumidification system of any one of Examples 1-5, wherein, upon entry into the heat and mass exchanger, the difference in salt ion concentration between the high salt ion concentration liquid desiccant and the low salt ion concentration liquid desiccant is 20% by weight (wt %).

Example 7. The dehumidification system of any one of Examples 1-6, wherein, upon entry into the at least one electrolysis stack, the difference in salt ion concentration between the high salt ion concentration liquid desiccant and the low salt ion concentration liquid desiccant is 10 wt %.

Example 8. The dehumidification system of any one of Examples 1-7, wherein, upon entry into the heat and mass exchanger, the high salt ion concentration liquid desiccant has a salt ion concentration of 35 wt %.

Example 9. The dehumidification system of any one of Examples 1-8, wherein, upon entry into the heat and mass exchanger, the low salt ion concentration liquid desiccant has a salt ion concentration of 15 wt %.

Example 10. The dehumidification system of any one of Examples 1-9, wherein, in the at least one electrodialysis stack, the high salt ion concentration liquid desiccant is converted into the low salt ion concentration liquid desiccant, and the low salt ion concentration liquid desiccant is converted into the high salt ion concentration liquid desiccant.

Example 11. The dehumidification system of any one of Examples 1-10, wherein the system comprises two, three, four, five, six, seven, eight, nine, ten, eleven, twelve, thirteen, fourteen, fifteen, sixteen, seventeen, eighteen, nineteen or twenty electrodialysis stacks arranged in series between a cathode and an anode.

Example 12. A method of dehumidifying air, comprising:

absorbing water from a process air stream into a high salt ion concentration liquid desiccant in a heat and mass exchanger, dehumidifying the process air stream;

desorbing water from a low salt ion concentration liquid desiccant into a purge air stream in the heat and mass exchanger;

moving the high salt ion concentration liquid desiccant and the low salt ion concentration liquid desiccant to at least one electrodialysis stack;

rejecting salt ions from the high salt ion concentration liquid desiccant to the low salt ion concentration liquid desiccant in the at least one electrodialysis stack, converting the high salt ion concentration liquid desiccant into the low salt ion concentration liquid desiccant; and accepting ions from the high salt ion concentration liquid desiccant into the low salt ion concentration liquid desiccant in the at least one electrodialysis stack, converting the low salt ion concentration liquid desiccant into the high salt ion concentration liquid desiccant;

wherein:

the high salt ion concentration liquid desiccant and the low salt ion concentration liquid desiccant flow in a single, continuous stream that connects the heat and mass exchanger and the at least one electrodialysis stack; and the converted high salt ion concentration liquid desiccant and the converted low salt ion concentration liquid desiccant are moved to the mass and heat exchanger.

Example 13. The method of Example 12, further comprising purging heat from the high salt ion concentration liquid desiccant into the low salt ion concentration liquid desiccant in the heat and mass exchanger, cooling the dehumidified process air stream.

Example 14. The method of Example 12 or Example 13, wherein the high salt ion concentration liquid desiccant and the low salt ion concentration liquid desiccant comprise the same salt solution selected from sodium chloride, potassium chloride, potassium iodide, lithium chloride, copper(II) chloride, silver chloride, calcium chloride, chlorine fluoride, bromomethane, iodoform, hydrogen chloride, lithium bromide, hydrogen bromide, potassium acetate, 1-Ethyl-3-methylimidazolium acetate, and combinations thereof.

Example 15. The method of Example 14, wherein the salt solution is selected from lithium chloride and calcium chloride.

Example 16. The method of Example 14 or Example 15, wherein the salt solution is lithium chloride.

Example 17. The method of any one of Examples 12-16, wherein, when absorbing water from a process air stream into a high salt ion concentration liquid desiccant and desorbing water from a low salt ion concentration liquid desiccant, the difference in salt ion concentration between the high salt ion concentration liquid desiccant and the low salt ion concentration liquid desiccant is 20% by weight (wt %).

Example 18. The method of any one of Examples 12-16, wherein:

when initiating the rejection of salt ions from the high salt ion concentration liquid desiccant to the low salt ion concentration liquid desiccant in the at least one electrodialysis stack, and when initiating the acceptance of ions from the high salt ion concentration liquid desiccant into the low salt ion concentration liquid desiccant in the at least one electrodialysis stack, the difference in salt ion concentration between the high salt ion concentration liquid desiccant and the low salt ion concentration liquid desiccant is 10 wt %.

Example 19. The method of any one of Examples 12-18, wherein, when absorbing water from the process air stream, the high salt ion concentration liquid desiccant has a salt ion concentration of 35 wt %.

Example 20. The method of any one of Examples 12-19, wherein, when desorbing water into the purge air stream, the low salt ion concentration liquid desiccant has a salt ion concentration of 15 wt %.

What is claimed is:

1. A system, comprising:
a heat and mass exchanger;
at least one electrodialysis stack;
a first liquid desiccant; and
a second liquid desiccant;
wherein:
the first liquid desiccant and the second liquid desiccant flow through the heat and mass exchanger to the at least one electrodialysis stack;
the first liquid desiccant absorbs water from a process air stream in the heat and mass exchanger and rejects salt ions to the second liquid desiccant in the at least one electrodialysis stack; and
the second liquid desiccant desorbs water to a purge air stream in the heat and mass exchanger and accepts ions from the first liquid desiccant in the at least one electrodialysis stack.

2. The system of claim 1, wherein the first liquid desiccant and the second liquid desiccant comprise the same salt solution.

3. The system of claim 1, wherein the first liquid desiccant and the second liquid desiccant comprise a salt solution selected from sodium chloride, potassium chloride, potassium iodide, lithium chloride, copper(II) chloride, silver chloride, calcium chloride, chlorine fluoride, bromomethane, iodoform, hydrogen chloride, lithium bromide, hydrogen bromide, potassium acetate, 1-Ethyl-3-methylimidazolium acetate, and combinations thereof.

4. The system of claim 3, wherein the salt solution is selected from lithium chloride and calcium chloride.

5. The system of claim 3, wherein the salt solution is lithium chloride.

6. The system of claim 1, wherein, upon entry into the heat and mass exchanger, the difference in salt ion concentration between the first liquid desiccant and the second liquid desiccant is 20% by weight (wt %).

7. The system of claim 1, wherein, upon entry into the at least one electrolysis stack, the difference in salt ion concentration between the first liquid desiccant and the second liquid desiccant is 10 wt %.

8. The system of claim 1, wherein, upon entry into the heat and mass exchanger, the first liquid desiccant has a salt ion concentration of 35 wt %.

9. The system of claim 1, wherein, upon entry into the heat and mass exchanger, the second liquid desiccant has a salt ion concentration of 15 wt %.

10. The system of claim 1, wherein, in the at least one electrodialysis stack, the first liquid desiccant is converted into the second liquid desiccant, and the second liquid desiccant is converted into the first liquid desiccant.

11. The system of claim 1, wherein the system comprises two, three, four, five, six, seven, eight, nine, ten, eleven, twelve, thirteen, fourteen, fifteen, sixteen, seventeen, eighteen, nineteen or twenty electrodialysis stacks arranged in series between a cathode and an anode.

12. A method of dehumidifying air, comprising:
absorbing water, by a heat and mass exchanger, from a process air stream into a first liquid desiccant, dehumidifying the process air stream;
desorbing water, by the heat and mass exchanger, from a second liquid desiccant into a purge air stream;
moving the first liquid desiccant and the second liquid desiccant to at least one electrodialysis stack;
rejecting salt ions from the first liquid desiccant to the second liquid desiccant in the at least one electrodialysis stack, converting the first liquid desiccant into the second liquid desiccant; and
accepting ions from the first liquid desiccant into the second liquid desiccant in the at least one electrodialysis stack, converting the second liquid desiccant into the first liquid desiccant;
wherein:
the first liquid desiccant and the second liquid desiccant connect the heat and mass exchanger to the at least one electrodialysis stack; and
the converted first liquid desiccant and the converted second liquid desiccant are moved to the mass and heat exchanger.

13. The method of claim 12, further comprising purging heat from the first liquid desiccant into the second liquid desiccant in the heat and mass exchanger, cooling the dehumidified process air stream.

14. The method of claim 12, wherein the first liquid desiccant and the second liquid desiccant comprise the same salt solution selected from sodium chloride, potassium chloride, potassium iodide, lithium chloride, copper(II) chloride, silver chloride, calcium chloride, chlorine fluoride, bromomethane, iodoform, hydrogen chloride, lithium bromide, hydrogen bromide, potassium acetate, 1-Ethyl-3-methylimidazolium acetate, and combinations thereof.

15. The method of claim 14, wherein the salt solution is selected from lithium chloride and calcium chloride.

16. The method of claim 14, wherein the salt solution is lithium chloride.

17. The method of claim 12, wherein, when absorbing water from a process air stream into the first liquid desiccant and desorbing water from the second liquid desiccant, the difference in salt ion concentration between the first liquid desiccant and the second liquid desiccant is 20% by weight (wt %).

18. The method of claim 12, wherein:
when initiating the rejection of salt ions from the first liquid desiccant to the second liquid desiccant in the at least one electrodialysis stack, and
when initiating the acceptance of ions from the first liquid desiccant into the second liquid desiccant in the at least one electrodialysis stack,
the difference in salt ion concentration between the first liquid desiccant and the second liquid desiccant is 10 wt %.

19. The method of claim 12, wherein, when absorbing water from the process air stream, the first liquid desiccant has a salt ion concentration of 35 wt %.

20. The method of claim 12, wherein, when desorbing water into the purge air stream, the second liquid desiccant has a salt ion concentration of 15 wt %.

* * * * *